(12) United States Patent
Nespolo et al.

(10) Patent No.: US 11,530,936 B2
(45) Date of Patent: Dec. 20, 2022

(54) PLUG-AND-PLAY STEPPER MOTOR FOR A POINTER DISPLAY ASSEMBLY

(71) Applicants: DENSO International America, Inc., Southfield, MI (US); DENSO CORPORATION, Kariya (JP)

(72) Inventors: Martin Nespolo, Grosse Pointe Woods, MI (US); Christopher Abrego, Grosse Pointe Woods, MI (US); Sibu Varughese, Sterling Heights, MI (US); Gareth Webb, New Hudson, MI (US); Jill Garcia, Waterford, MI (US); Christopher Arms, Farmington Hills, MI (US); Zakary Gertlar, Birmingham, MI (US); Victor Vulcu, Royal Oak, MI (US); Bart Zudell, Southfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 758 days.

(21) Appl. No.: 16/528,843

(22) Filed: Aug. 1, 2019

(65) Prior Publication Data
US 2021/0033435 A1   Feb. 4, 2021

(51) Int. Cl.
*G01D 13/26*   (2006.01)
*H02P 8/20*   (2006.01)
(Continued)

(52) U.S. Cl.
CPC ........... *G01D 13/265* (2013.01); *B60K 35/00* (2013.01); *G09G 5/36* (2013.01); *H02P 8/20* (2013.01);
(Continued)

(58) Field of Classification Search
CPC .. G01D 13/265; G01D 2213/10; G01D 13/22; B60K 35/00; B60K 2370/336;
(Continued)

(56) References Cited

U.S. PATENT DOCUMENTS

| 5,905,434 A * | 5/1999 | Steffan | B60Q 1/50 |
| | | | 116/28 R |
| 6,600,409 B2 * | 7/2003 | Cohen | G01P 1/08 |
| | | | 340/936 |

(Continued)

FOREIGN PATENT DOCUMENTS

| DE | 10046237 B4 | 1/2008 |
| DE | 102008062241 A1 | 8/2009 |
| EP | 2952945 A1 | 12/2015 |

*Primary Examiner* — Nimeshkumar D Patel
*Assistant Examiner* — Tania Courson
(74) *Attorney, Agent, or Firm* — Harness, Dickey & Pierce, P.L.C.

(57) ABSTRACT

Systems and methods are disclosed and include a needle control module that includes a processor configured to execute instructions stored in a nontransitory computer-readable medium, a motor driver circuit in communication with the needle control module, the motor driver circuit controlling a stepper motor attached to a needle, and a housing enclosing the needle control module, the motor driver circuit, and the stepper motor, the housing being physically attached to a display of a vehicle. In response to the needle control module receiving a signal representing vehicle state information, the needle control module is configured to instruct the motor driver circuit to control movement of the stepper motor and adjust a position of the needle based on the signal.

21 Claims, 19 Drawing Sheets

(51) Int. Cl.
*B60K 35/00* (2006.01)
*G09G 5/36* (2006.01)

(52) U.S. Cl.
CPC .... *B60K 2370/336* (2019.05); *B60K 2370/47* (2019.05); *B60K 2370/48* (2019.05); *B60K 2370/52* (2019.05); *B60K 2370/589* (2019.05); *B60K 2370/691* (2019.05); *B60K 2370/6992* (2019.05); *B60K 2370/98* (2019.05); *B60Y 2400/216* (2013.01); *G09G 2354/00* (2013.01)

(58) Field of Classification Search
CPC ............ B60K 2370/47; B60K 2370/48; B60K 2370/52; B60K 2370/589; B60K 2370/691; B60K 2370/6992; B60K 2370/98; B60K 2370/698; B60K 2370/6985; G09G 5/36; G09G 2354/00; H02P 8/20; H02P 8/00; B60Y 2400/216
See application file for complete search history.

(56) References Cited

U.S. PATENT DOCUMENTS

| | | | | |
|---|---|---|---|---|
| 6,741,184 | B1* | 5/2004 | Miller | G01D 13/26 |
| | | | | 362/555 |
| 6,947,576 | B2* | 9/2005 | Stam | G06V 20/10 |
| | | | | 382/104 |
| 7,083,312 | B2* | 8/2006 | Pastrick | B60Q 1/2665 |
| | | | | 359/872 |
| 8,056,388 | B2* | 11/2011 | Sasaki | G01D 13/22 |
| | | | | 73/1.37 |
| 9,945,702 | B2* | 4/2018 | DeGowske | G01D 13/12 |
| 2006/0266273 | A1 | 11/2006 | Westberg et al. | |
| 2011/0179990 | A1* | 7/2011 | Zecirovic | G01L 19/083 |
| | | | | 116/288 |
| 2013/0145297 | A1 | 6/2013 | Ricci et al. | |
| 2017/0253178 | A1* | 9/2017 | Tane | G01D 7/06 |

* cited by examiner

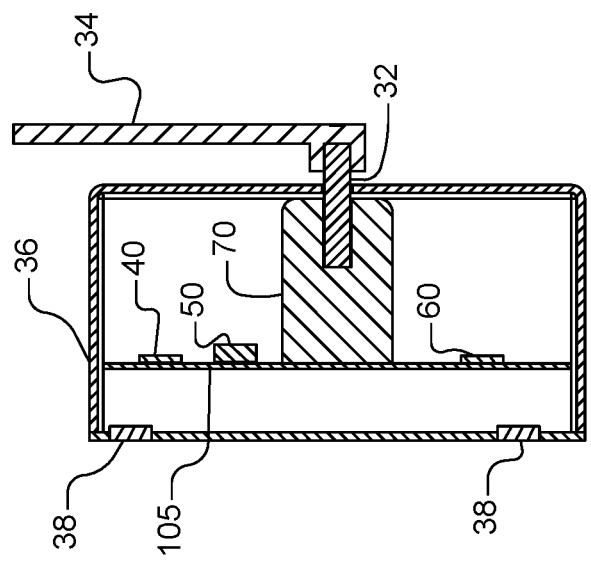
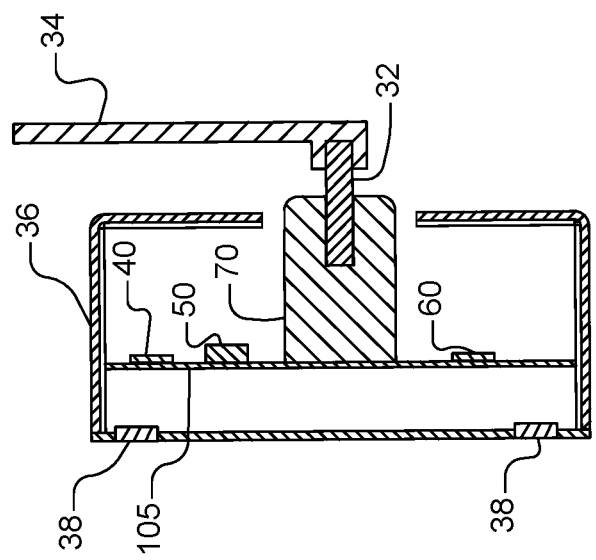

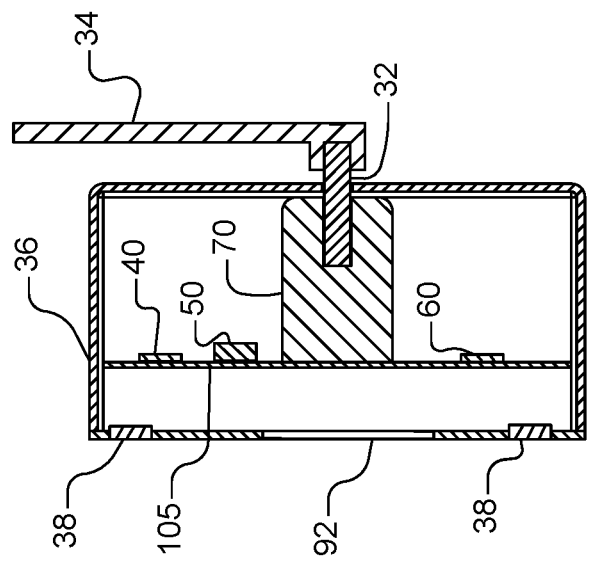
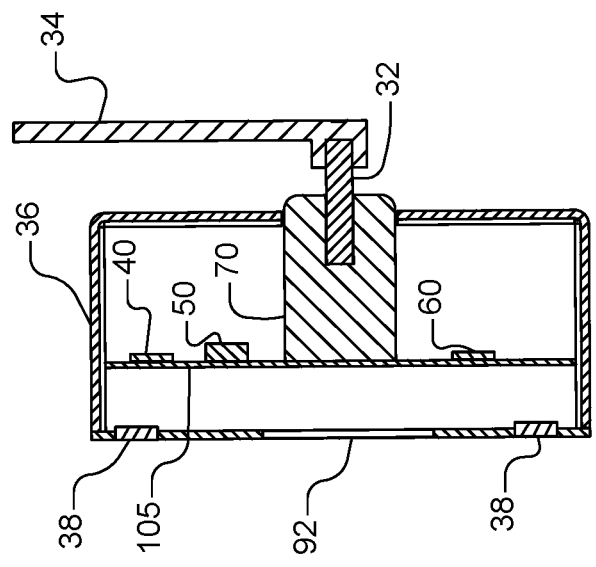

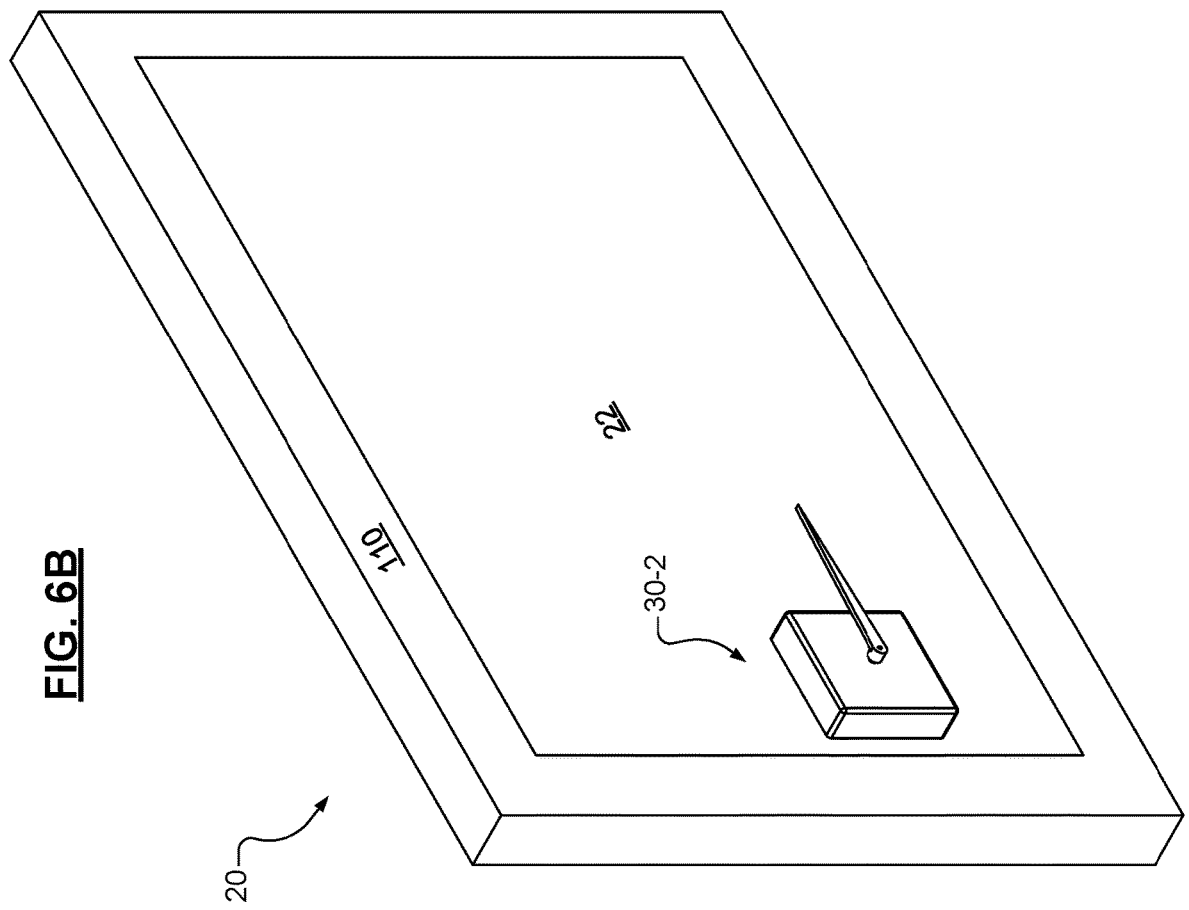

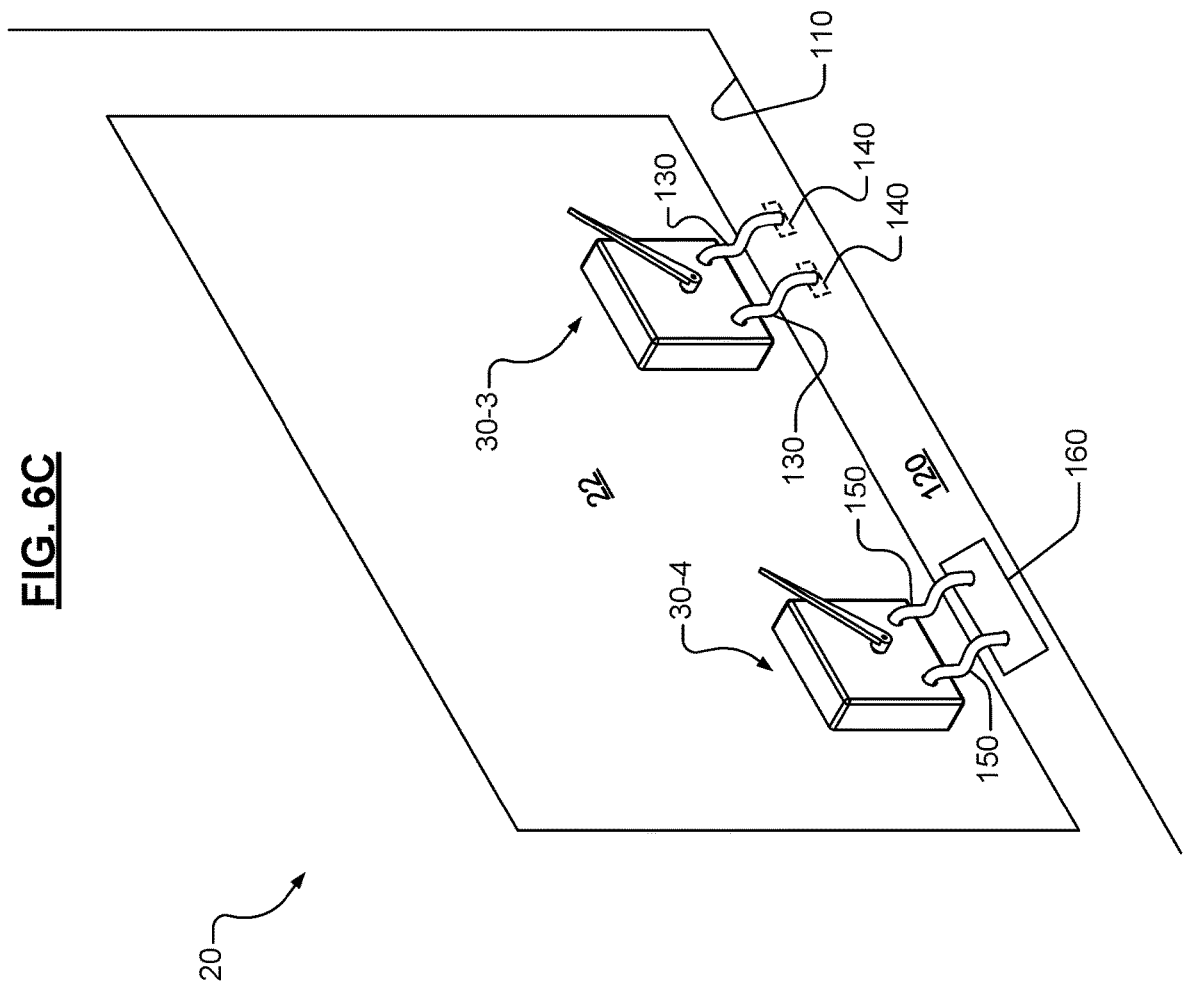

PLUG-AND-PLAY STEPPER MOTOR FOR A POINTER DISPLAY ASSEMBLY

FIELD

The present disclosure relates to a stepper motor for a pointer display assembly and, more specifically, to a plug-and-play stepper motor for a pointer display assembly of a vehicle display and to systems and methods for attaching a plug-and-play stepper motor for a pointer display assembly to a vehicle display.

BACKGROUND

This section provides background information related to the present disclosure and is not necessarily prior art.

Automotive manufacturers are consolidating electronic control modules that are conventionally implemented as stand-alone apparatuses. As an example, automotive manufacturers are consolidating all of the software, hardware, and casing materials utilized for interior display functions, such as an instrument cluster, a head-up display (HUD), an in-vehicle infotainment (IVI) display, a navigation display, rear-seat displays, rearview mirror displays, side view mirror displays, etc., into a single electronic control module. Moreover, the single electronic control module may display metrics and/or other information on a display device, such as a thin-film transistor (TFT) display device.

However, consolidating a plurality of electronic control modules into a single electronic control module may impede the implementation of analog gauges in addition to or as an alternative to the TFT display device. As an example, vehicle displays for instrument clusters are used to convey vehicle information such as vehicle speed, engine speed, engine temperature, fuel level, engine oil level, etc., and may include a pointer/needle that is driven by a stepper motor in order to point to different portions of a meter or gauge and convey information to the operator. However, the circuitry required to operate the stepper motors are not included within the TFT display device, thereby making the consolidation of electronic control modules and simultaneous incorporation of analog gauges difficult.

SUMMARY

This section provides a general summary of the disclosure, and this section is not a comprehensive disclosure of its full scope or all of its features.

In accordance with the present teachings, a system includes a needle control module that includes a processor configured to execute instructions stored in a nontransitory computer-readable medium, a motor driver circuit in communication with the needle control module, the motor driver circuit controlling a stepper motor attached to a needle, and a housing enclosing the needle control module, the motor driver circuit, and the stepper motor, the housing being physically attached to a display of a vehicle. In response to the needle control module receiving a signal representing vehicle state information, the needle control module is configured to instruct the motor driver circuit to control movement of the stepper motor and adjust a position of the needle based on the signal.

In other features, an optical sensor receives light from the display through an opening of the housing and generates the signal based on the received light from the display.

In other features, the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

In other features, the system further comprises a photovoltaic converter system configured to convert light emitted by the display into electrical power, wherein the needle control module and the motor driver circuit receive the electrical power from the photovoltaic converter system.

In other features, the system further comprises a communication interface configured to communicate with an electronic control module of the vehicle, the needle control module receiving the signal from the electronic control module.

In other features, the communication interface is a wireless communication interface.

In other features, the communication interface is a wired communication interface.

In other features, the communication interface is a universal serial bus (USB) communication interface.

In other features, the system further comprises a power interface that receives electrical power from a power source and supplies electrical power to the needle control module and the motor driver circuit.

In other features, the power interface is a hardwired power interface that receives electrical power from the power source through at least one wire.

In other features, the power interface is a wireless power interface that receives electrical power from the power source through induction.

In accordance with the present teachings, another system includes a needle control module that includes a processor configured to execute instructions stored in a nontransitory computer-readable medium, a motor driver circuit in communication with the needle control module, the motor driver circuit controlling a stepper motor attached to a needle, and a housing enclosing the needle control module, the motor driver circuit, and the stepper motor, the housing having a channel configured to receive glue and physically attach the housing to a display of a vehicle with the glue. In response to the needle control module receiving a signal representing vehicle state information, the needle control module is configured to instruct the motor driver circuit to control movement of the stepper motor and adjust a position of the needle based on the signal.

In other features, the glue is an optical adhesive that receives light from the display, the system further comprising a light pipe that directs light from the optical adhesive, through the housing, to the needle to illuminate the needle.

In other features, the system further comprises a lens that receives light from the display, the system further comprising a light pipe that directs light from the lens, through the housing, to the needle to illuminate the needle.

In other features, the system further comprises a glue passage configured to receive the glue through a sidewall of the housing and direct the glue through the housing to the channel.

In other features, the system further comprises an optical sensor that receives light from the display through an opening of the housing and generates the signal based on the received light from the display.

In other features, the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

In accordance with the present teachings, a method includes receiving, with an optical sensor disposed within a housing of a pointer display assembly, light from a display through an opening of the housing, the pointer display assembly including a stepper motor, a needle control module, and a motor driver circuit enclosed within the housing, the stepper motor being attached to a needle, the motor driver circuit being in communication with the needle control module and controlling the stepper motor, the housing being physically attached to a display of a vehicle, and the light from the display being generated using at least one of a predetermined pattern, a predetermined graphic, a predetermined shape, and a predetermined color. The method also includes generating, with the optical sensor, a signal based on the received light from the display. The method also includes decoding, with the needle control module, the signal to determine the at least one of the predetermined pattern, the predetermined graphic, the predetermined shape, and the predetermined color. The method also includes determining, with the needle control module, vehicle state information based on the decoding of the at least one of the predetermined pattern, the predetermined graphic, the predetermined shape, and the predetermined color. The method also includes instructing, with the needle control module, the motor driver circuit to control movement of the stepper motor and adjust a position of the needle based on the vehicle state information.

In other features, the method further includes converting, with a photovoltaic converter system enclosed within the housing, light emitted by the display into electrical power, wherein the needle control module and the motor driver circuit receive the electrical power from the photovoltaic converter system.

In other features, the housing is attached to the display with an optical adhesive that receives light from the display and wherein a light pipe directs light from the optical adhesive, through the housing, to the needle to illuminate the needle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 5A to 5F illustrate cross-sectional views of pointer display assemblies according to the present disclosure.

FIGS. 6A to 6C illustrate pointer assemblies coupled to a display according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
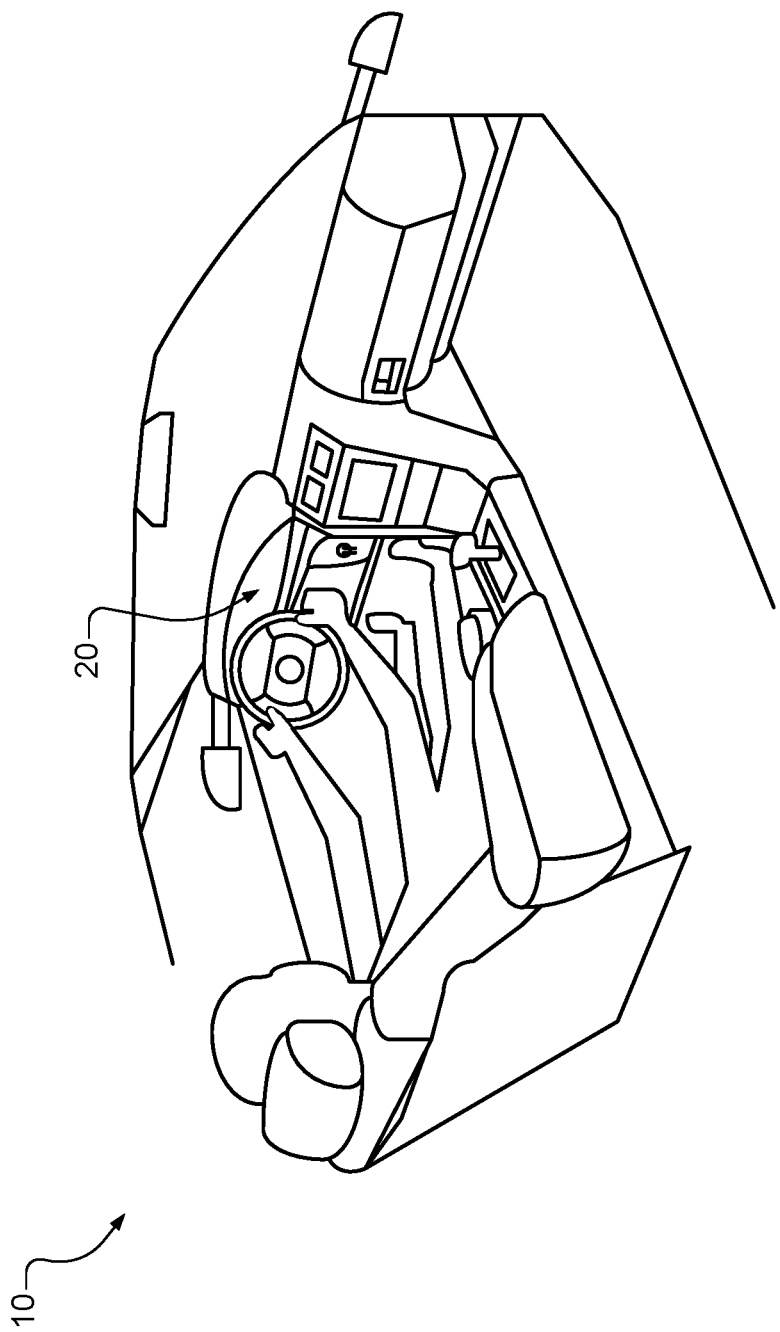
FIG. 1 illustrates an example display for a vehicle according to the present disclosure.

With reference to FIG. 1, an illustration of a display 20 for an instrument cluster of a vehicle 10 is shown. In the example, the display 20 of the instrument cluster is configured to provide various information and metrics of the vehicle 10 to an operator, such as a vehicle speed, an engine speed, an engine temperature, a fuel level, an engine oil level, etc. While a display 20 for an instrument cluster is shown as an example in FIG. 1, the present teachings can be applied to and used with other vehicle display systems, such as a head-up display (HUD), an in-vehicle infotainment (IVI) display, a navigation display, rear-seat displays, rear-view mirror displays, side view mirror displays, or any other applicable display system in the vehicle. In addition, while the present examples are discussed with reference to a display 20 of a vehicle, the present teachings are also applicable to and can be used with display systems outside of a vehicle.

Figure 2:
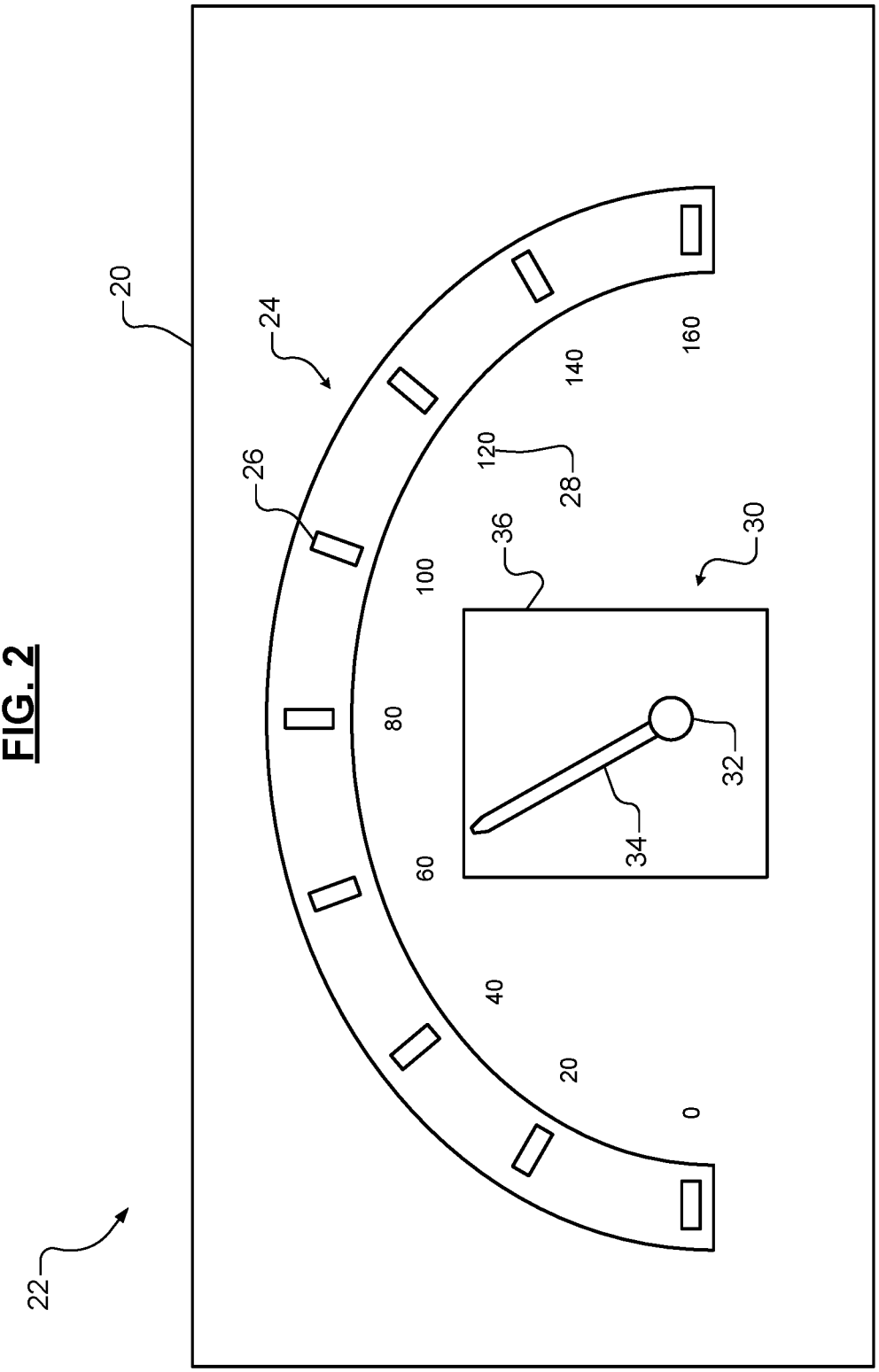
FIG. 2 illustrates an example display according to the present disclosure.

With reference to FIG. 2, a detailed illustration of the display 20 and the instrument cluster 22 is shown. The display 20 may include a gauge 24 and a pointer display assembly 30. The display 20 may be any suitable type of electronic display screen, such as a TFT display device, and OLED display device, an LCD display device, etc. The gauge 24 includes a plurality of tick marks 26, which are spaced apart about the gauge 24 and aligned with numerals 28. In some embodiments, there may be more (or less) tick marks 26 than numerals 28. In other embodiments, there may be no numerals 28 and only tick marks 26. A needle 34 of the pointer display assembly 30 is rotatably movable in order to point to any one of tick marks 26 and numerals 28 or any other portion of the gauge 24.

The gauge 24 is configured to communicate and provide any type of information to the operator of the vehicle 10. As an example, the gauge 24 may be implemented as a speedometer, a tachometer, a fuel level gauge, an engine temperature gauge, an engine oil level gauge, a battery voltage gauge, etc. The numerals 28 may be printed on the display 20 in any suitable manner or displayed by the display 20 itself. When the display 20 displays the numerals 28, the display 20 can readily change the numerals 28 in order to change the type of gauge presented. For example, the system can be configured to allow the operator to change the gauge from a speedometer to a tachometer based on input from the operator indicating the operator's preference.

In one embodiment, the pointer display assembly 30 includes a hub 32, with the needle 34 extending from the hub 32, and a housing 36. Furthermore, in some embodiments, the hub 32 may be rotatable by a post or shaft that extends from and is rotated by a motor, discussed in further detail below. The pointer display assembly 30 is also described below in further detail. In addition, the pointer display assembly 30 may be configured without a hub 32 and may utilize a gear assembly, as discussed in further detail below.

With reference to FIGS. 3A to 3E, functional block diagrams of different example embodiments of the pointer display assembly 30 are shown. As discussed in further detail, the example embodiments of FIGS. 3A to 3E illustrate different example implementations for providing or generating electrical power to or for the pointer display assembly 30 and different implementations for communicating with the pointer display assembly 30. While FIGS. 3A to 3E are illustrated as examples, different features from the different implementations can be alternatively combined in accordance with the present teachings in additional implementations.

In each of the embodiments of FIGS. 3A to 3E, the pointer display assembly 30 includes the needle 34, a needle control module 40, an illumination module 50, a motor driver 60, which includes a phase control module 62 and a power amplifier module 64, and a motor 70, as described in further detail below.

Figure 3A:
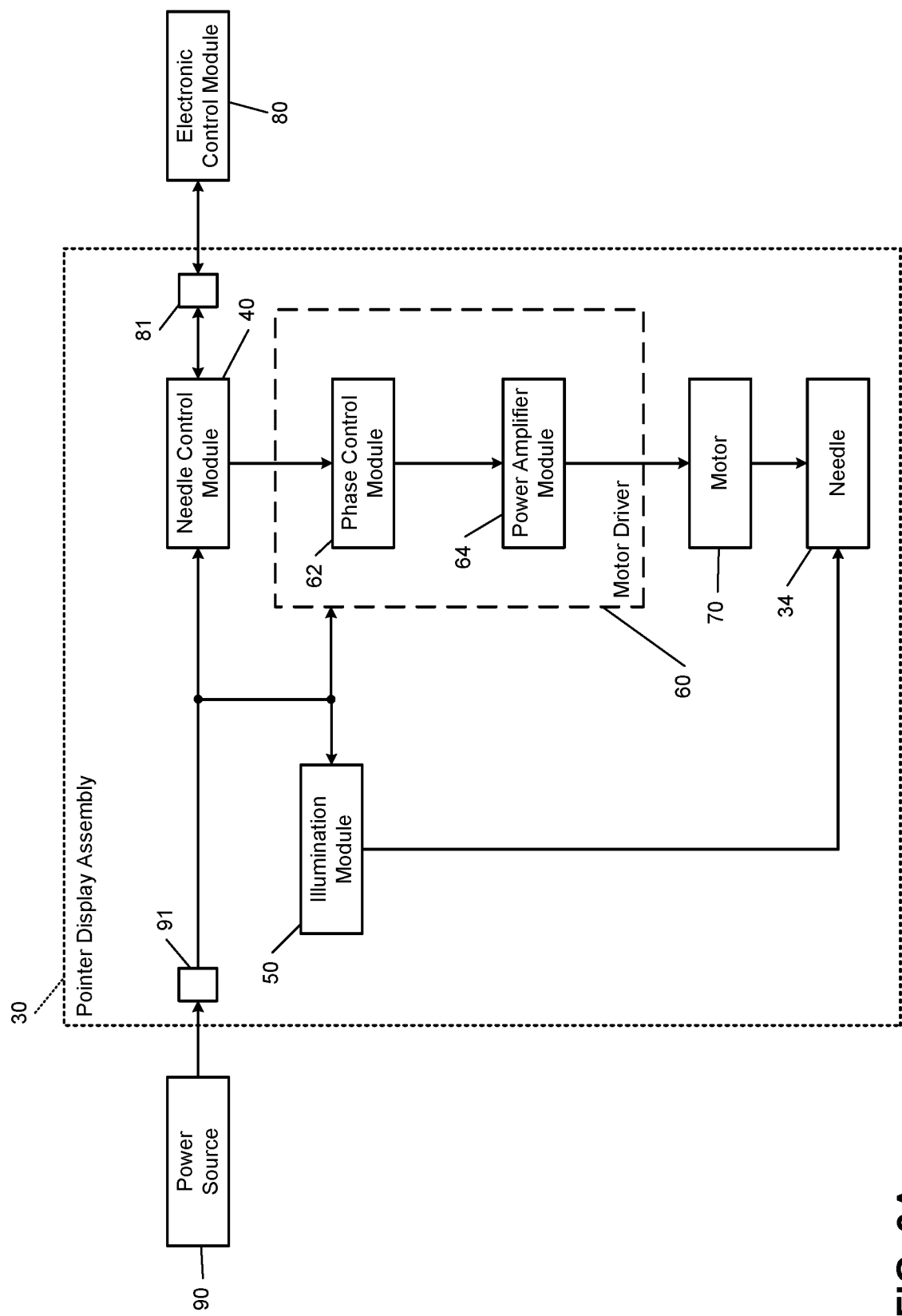
FIGS. 3A to 3E illustrate example functional block diagrams of pointer display assemblies according to the present disclosure.

With reference to FIG. 3A, the pointer display assembly 30 may be connected to a power source 90 through a power interface 91. The power interface 91, for example, can be a wired power interface 91 that receives power from the power source 90 through, for example, a connected power wire. Alternatively, the power interface 91 can be a wireless/induction power interface that receives power from the power source 90 through a wireless connection using induction charging between the power source 90 and the power interface 91.

The needle control module 40 may receive signals from an electronic control module (ECM) 80 of the vehicle 10. The signals may be representative of a vehicle speed, an engine speed, an engine temperature, a fuel level, or other similar vehicle information. In the example of FIG. 3A, the needle control module 40 communicates with the ECM 80 via a communication interface 81. The communication interface 81 can be a wired or wireless communication interface. For example, the communication interface 81 can be connected to the ECM 80 via a hardwire communication link, such as a twisted-pair cable or other similar hardwire conductive link. Alternatively, the communication interface 81 can communicate with the ECM 80 via a wireless telemetric communication link, such as a Bluetooth link, Bluetooth low-energy link, a Wi-Fi or Wi-Fi direct link, a cellular link, or another wireless communication link using a suitable wireless communication protocol.

In response to receiving signals from the ECM 80, the needle control module 40 is configured to activate and control the motor 70 using the motor driver 60. In one embodiment, the motor 70 is implemented by a stepper-motor or other similar motor. In order to activate the motor 70, the needle control module 40 may output a control signal to the motor driver 60. The control signal, for example, may include a pointer angle instruction indicating a desired pointer angle for the motor 70 and, consequently, the needle 34. For example, with additional reference to FIG. 2 (and assuming for purposes of this example that the gauge 24 indicates speed in kilometers per hour), the ECM 80 can communicate to the needle control module 40 that the vehicle speed is currently 80 kilometers per hour. The needle control module 40 can then determine the appropriate angle for the needle 34 so that the needle 34 points to 80 kilometers per hour, and output a control signal to the motor driver 60 indicating a pointer angle instruction with a desired pointer angle of ninety degrees, corresponding to 80 kilometers per hour the gauge 24. In order to control the motor 70, the phase control module 62 of the motor driver 60 receives the control signal from the needle control module 40 and outputs a signal that includes information indicating which phases of the motor 70 need to be energized and a sequence of phases of the motor 70 that need to be energized to control the motor 70 in accordance with the pointer angle instruction to move the motor 70, and consequently the needle 34, to the ninety degree position. The power amplifier module 64, which may be implemented by one or more bipolar-junction transistors (BJTs), metal-oxide semiconductor field-effect transistors (MOSFETs), and/or power-converter integrated circuits, may amplify the signal outputted by the phase control module 62, thereby enabling the phases of the motor 70 to be sufficiently energized in accordance with the pointer angle instruction. In one embodiment, the power amplifier module 64 may continuously turn on and off at a predefined frequency in order to ensure that the motor 70 moves through the correct sequence to move the motor, and consequently the needle 34, to the appropriate position in accordance with the pointer angle instruction. The needle 34 can be, for example, coupled to a shaft of the motor 70 (shown below in FIGS. 5A-5D). Accordingly, in response to the motor 70 being activated by the motor driver 60 and the needle control module 40, a position of the needle 34 is changed in accordance with the pointer angle instruction and based on, in this example, the vehicle speed. As such, the operator of the vehicle 10 may readily view the speed of the vehicle 10 based on the position of the needle 34 and the gauge 24 within the display 20.

As shown in the example implementation of FIG. 3A, the needle control module 40, the illumination module 50, and the motor driver 60 can receive power from power source 90 via power interface 91. For example, the power source 90 can be directly coupled to the needle control module 40, the illumination module 50, and the motor driver 60 through the power interface 91, which can be a hardwire link or a wireless/induction link. As a more specific example, the power source 90 can be implemented by an indium-tin-oxide (ITO) layer of the display 20. Further, at least one conductive path of a plurality of conductive paths (e.g., multiple conductive paths arranged vertically and horizontally) disposed on a glass layer of the display 20 may electrically couple the various components of the pointer display assembly 30 to the ITO layer of the display 20. Additionally, the pointer display assembly 30 may include one or more converter circuits (e.g., a DC-DC converter integrated circuit) in order to convert the voltage value of the signal from the power source 90 into a voltage value that is suitable for operating the needle control module 40, the illumination module 50, and/or the motor driver 60. In other embodiments, the power source 90 can be implemented by a battery located in the vehicle 10. Further, as noted above, the power interface 91 can be a hardwire link that electrically couples the power source 90 and some of the components of the pointer display assembly 30. Alternatively, the power interface 91 can be a wireless/induction link that couples the various components of the pointer display assembly 30 to the power source 90.

The illumination module 50 is configured to illuminate the needle 34 in response to receiving power from the power source 90. In one embodiment, the illumination module 50 can include, and be implemented by, a light-emitting diode (LED) or other similar light source within the pointer display assembly 30. In other embodiments, the illumination module 50 may be removed, and the needle 34, which may include an organic light-emitting diode (OLED) or a material that emits light in response to receiving a targeted laser emission, may utilize the light from the display 20 in order to illuminate, as discussed in further detail below. The illumination module 50 can be configured to illuminate the needle 34 whenever power is supplied to the illumination module 50. Alternatively, the illumination module 50 can receive illumination instructions from the needle control module 40 indicating whether to illuminate the needle 34. For example, the ECM 80 may instruct the needle control module 40 to only illuminate the needle 34 during certain times, such as during night time. The needle control module 40 can, in turn, instruct the illumination module 50 to illuminate the needle based on the instructions from the electronic control module.

Figure 3B:
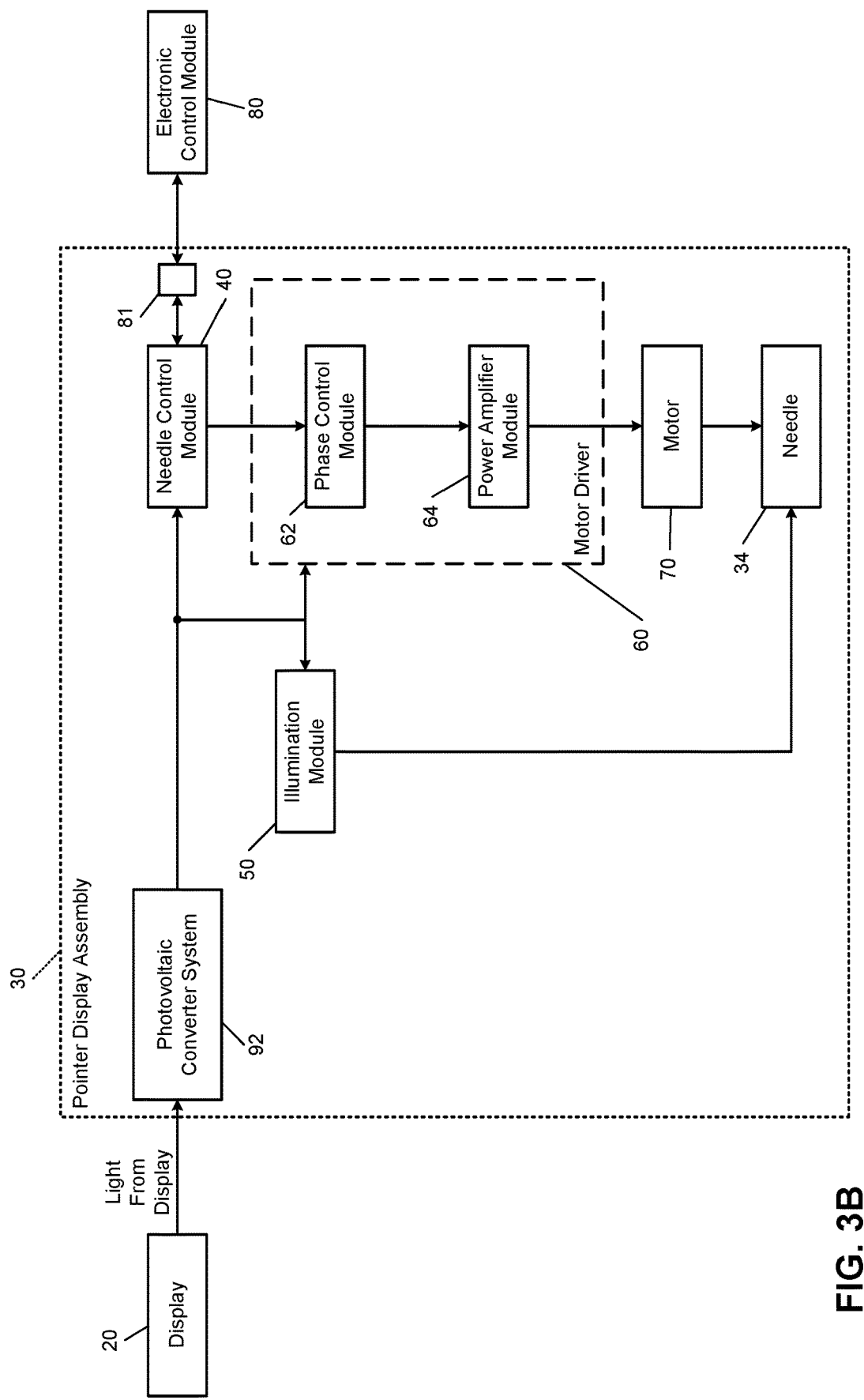

With reference to FIG. 3B, another example embodiment is shown. The example implementation of FIG. 3B is similar to the example implementation of FIG. 3A, except that the pointer display assembly 30 of FIG. 3B includes a photovoltaic converter system 92 in place of the power interface 91. In this example implementation, instead of receiving power from the power source 90, the pointer display assembly 30 of FIG. 3B uses the photovoltaic converter system to convert light from the vehicle display 20 into electrical power that is then distributed to the needle control module 40, the illumination module 50, and the motor driver 60. For example, when the display 20 is activated, i.e., pixels of the display 20 are emitting light, the photovoltaic converter system 92 can convert the light emitted by the display 20 to electrical energy that powers the needle control module 40, the illumination module 50, and the motor driver 60. The other components of the example implementation of FIG. 3B are similar to the components of FIG. 3A described above and, as such, are not described again here.

Figure 3C:
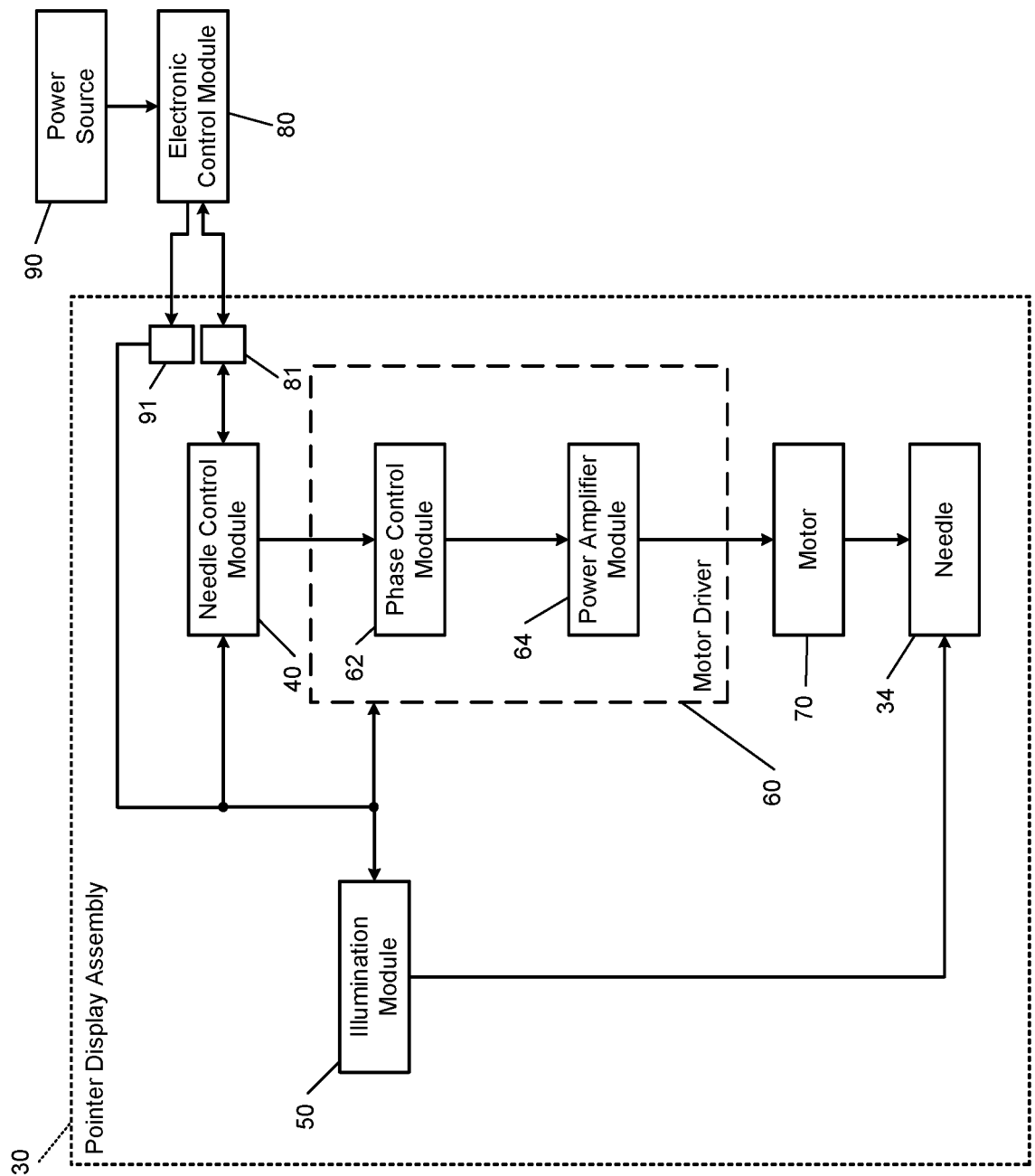

With reference to FIG. 3C, another example embodiment is shown. The example implementation of FIG. 3C is similar to the example implementation of FIG. 3A, except that instead of receiving power from power source 90 via power interface 91, the pointer display assembly 30 receives power from ECM 80 via the power interface 91. In this example implementation, the power source 90 provides power to the ECM 80 and the ECM 80 provides power to the power interface 91, which is then distributed to the needle control module 40, the illumination module 50, and the motor driver 60. In the example implementation of FIG. 3D, the power interface 91 and the communication interface 81 can be a combined power and communication interface. For example, the power interface 91 and the communication interface 81 can be a Universal Serial Bus (USB) interface that connects the ECM to the pointer display assembly 30 with a USB cable and USB connector. The other components of the example implementation of FIG. 3C are similar to the components of FIG. 3A described above and, as such, are not described again here.

Figure 3D:
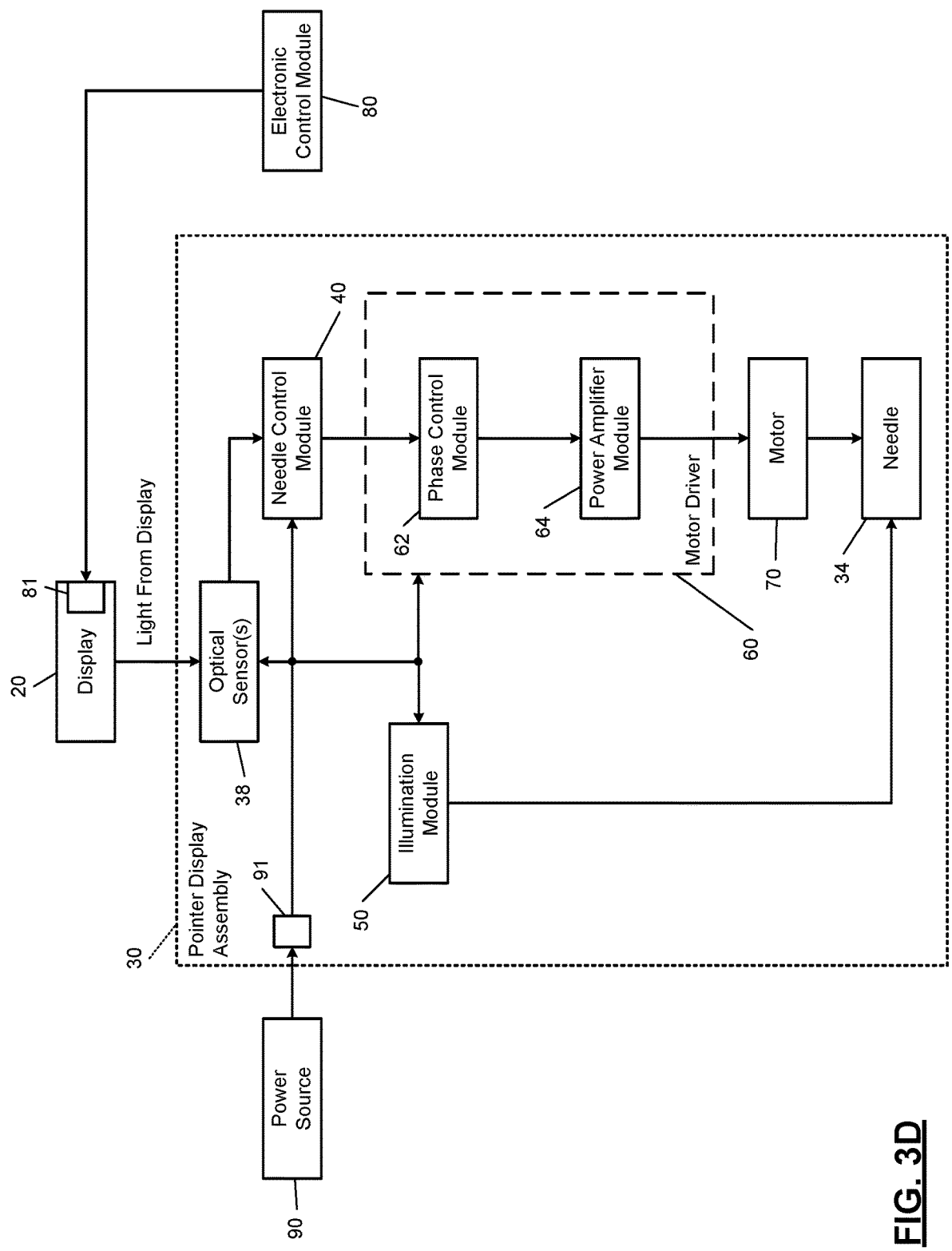

With reference to FIG. 3D, another example embodiment is shown. The example implementation of FIG. 3D is similar to the example implementation of FIG. 3A, except that the pointer display assembly includes one or more optical sensors 38 and ECM 80 communicates with the pointer display assembly via light from the display 20 that is sensed by one or more optical sensors 38. In the example implementation of FIG. 3D, the communication interface 81 is included within the display 20. As noted above, the communication interface 81 can be a wired or wireless communication interface. While the communication interface 81 is shown within the display 20, the communication interface 81 can alternatively be located within the ECM 80 or between the display 20 and the ECM 80. In the example implementation of FIG. 3D, the ECM 80 instructs and controls the display 20 such that pixels located beneath the pointer display assembly 30 are sensed by the optical sensor(s) 38. As discussed in further detail below, the optical sensor(s) 38 can communicate sensed data about the light from the display to the needle control module 40, which can determine and decode predetermined patterns, graphics, shapes, colors, etc., of the light from the display 20 to receive data from the ECM 80. In other words, the optical sensor(s) 38 can sense the patterns, graphics, shapes, and colors, etc., being displayed on the display 20 and communicate that pixel/display data to the needle control module 40, which determines and decodes the information being conveyed by the ECT 80 to the needle control module 40 based on the sensed patterns, graphics, shapes, colors, etc., being displayed on the display. For example, the needle control module 40 and the ECM 80 can each be configured with a communication protocol whereby certain predetermined patterns, graphics, shapes, colors, etc., of the light from the display 20 correspond to data elements to be communicated to the needle control module 40, such as vehicle information (e.g., vehicle speed, engine speed, fuel level, engine temperature, engine oil level, battery voltage, etc.), and/or any other information to be communicated to the display pointer assembly 30. Based on the decoded data received from the display 20 via the optical sensor(s) 38, the needle control module 40 can appropriately instruct the motor driver 60 to control the motor 70 and, consequently, the needle 34. Alternatively, instead of the communicated data corresponding to vehicle information, the communicated data represented by the predetermined patterns, graphics, shapes, colors, etc., can represent a pointer angle to be used by the needle control module 40 to control the motor driver 60, motor 70, and, consequently, the needle 34. Any predetermined protocol for using predetermined patterns, graphics, shapes, colors, etc., of the display 20 to communicate data from the ECM 80 to the pointer display assembly 30 and the needle control module 40 using the optical sensor(s) 38 can be used.

The optical sensor(s) 38 may obtain a refresh rate of the pixel area of the display 20 located underneath the pointer display assembly 30. The refresh rate can correspond to the frequency in which the light emitted from the pixels of the display 20 is updated. As an example, the refresh rate may be 200 Hertz (Hz). Additionally, the optical sensor(s) 38 may receive optical/light data from the pixels of the display 20 underneath the housing 36 through an opening located on the bottom of the housing 36, as discussed in further detail below. The other components of the example implementation of FIG. 3D are similar to the components of FIG. 3A described above and, as such, are not described again here.

Figure 3E:
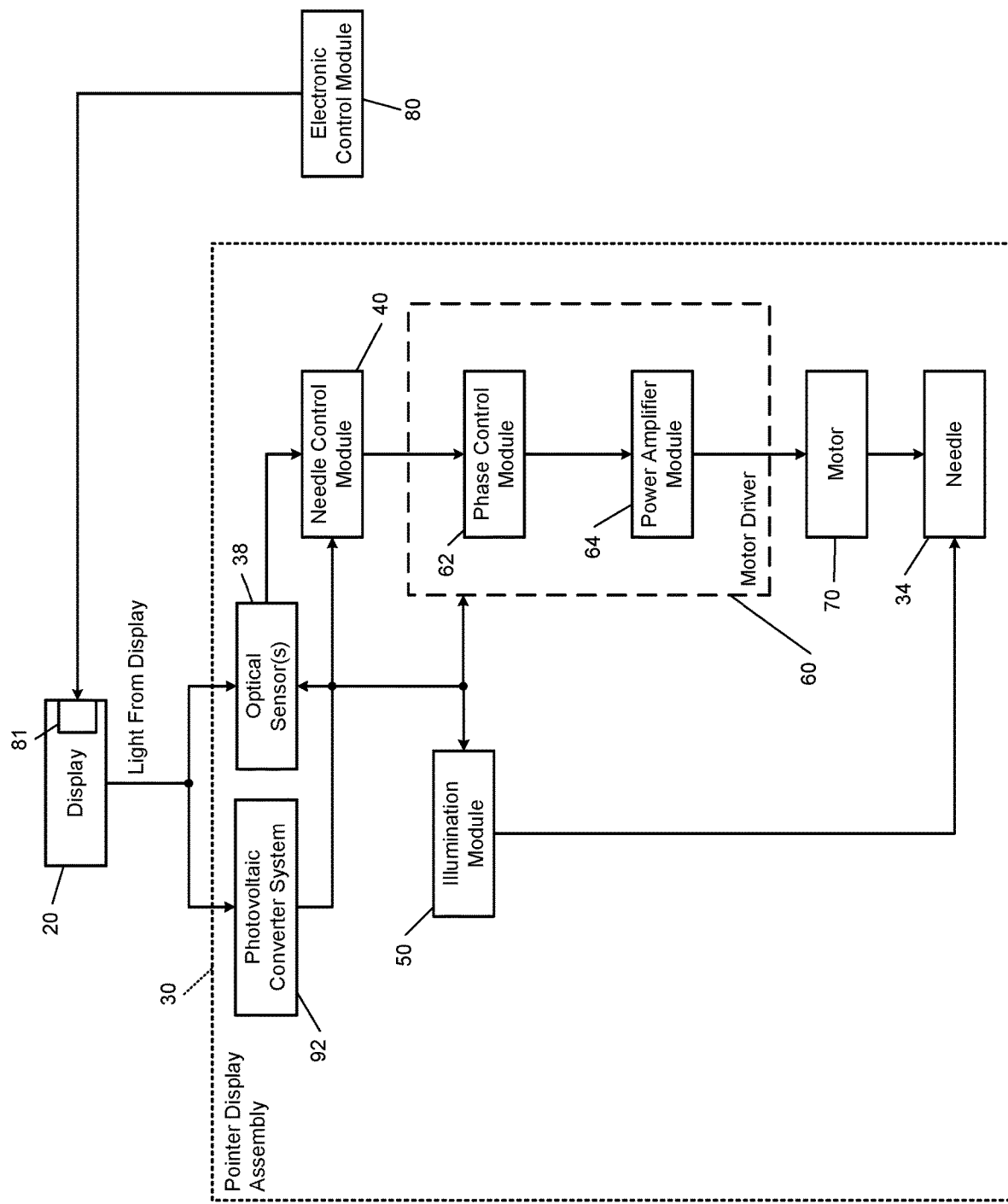

With reference to FIG. 3E, another example embodiment is shown. The example implementation of FIG. 3E is similar to the example implementation of FIG. 3D, except that the pointer display assembly 30 of FIG. 3E includes a photovoltaic converter system 92 in place of the power interface

91. In this example implementation, instead of receiving power from the power source 90, the pointer display assembly 30 of FIG. 3E uses the photovoltaic converter system to convert light from the display 20 into electrical power that is then distributed to the needle control module 40, the illumination module 50, and the motor driver 60. For example, when the display 20 is activated, i.e., pixels of the display 20 are emitting light, the photovoltaic converter system 92 can convert the light emitted by the display 20 to electrical energy that powers the needle control module 40, the illumination module 50, and the motor driver 60. The other components of the example implementation of FIG. 3E are similar to the components of FIG. 3D described above and, as such, are not described again here.

As noted above, individual features and components of the example embodiments of FIGS. 3A to 3E can be combined in alternative ways, resulting in additional implementations in accordance with the present teachings.

Figure 4:
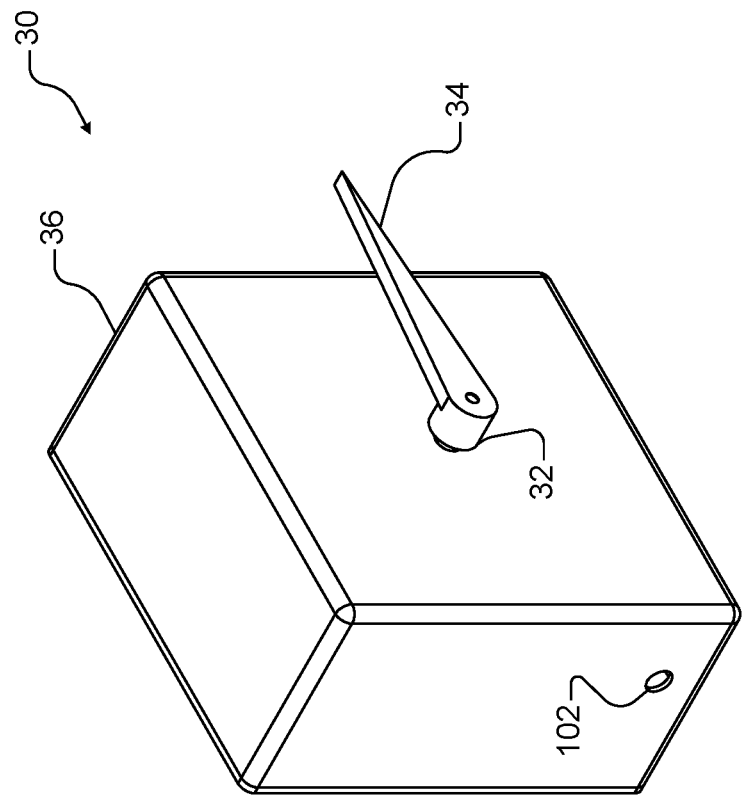
FIG. 4 is an illustration of a pointer display assembly according to the present disclosure.

With reference to FIG. 4, an example illustration of the pointer display assembly 30, which includes housing 36, is shown. In one embodiment, the housing 36 may have any suitable shape to enable the housing 36 to attach to a portion of the display 20, such as a box shape. Furthermore, the needle 34 extends from the hub 32, which is rotatable by a post that extends from and is rotated by the motor 70. As discussed in further detail below, in some implementations, the post and hub 32 may be excluded and replaced with a gear assembly. Additionally, in implementations that use a hardwired communication interface or a hardwired power interface, the hardwires for the communication interface and/or the power interface may be disposed through an opening 102 of the housing 36.

With reference to FIGS. 5A to 5F, cross-sectional illustrations of different example implementations of the pointer display assembly 30 are shown. As shown, the needle control module 40, the illumination module 50, the motor driver 60, and the motor 70 may be disposed on a printed circuit board (PCB) 105 of the pointer display assembly 30. Furthermore, the PCB 105 may receive electrical power from a wired or wireless power interface 91, discussed in detail above, or from a photovoltaic converter system 92, as discussed in detail above, and shown in FIGS. 5C, 5D, and 5F. The PCB 105 may also include the communication interface 81, discussed in detail above. Alternatively, the pointer display assembly 30 may include one or more optical sensor(s) 38 (shown in FIGS. 5A to 5F), which may be disposed between a respective opening of the housing 36 and may also be electrically coupled to the PCB 105 via a hardwire link (not shown).

In the embodiments shown in FIGS. 5A and 5C, the housing 36 may enclose only a portion of the motor 70. Furthermore, the housing 36 may have an opening with the motor 70 disposed therein. The opening may have a width that is larger than a width of the motor 70, thereby enabling the needle 34 to receive light emitted from the illumination module 50. In response to receiving the light from the illumination module 50, the needle 34 is configured to illuminate, as described above. Additionally or alternatively, a portion of the needle 34 may be connected to the illumination module 50 via suitable light piping that extends through the housing.

In other embodiments shown in FIGS. 5B and 5D, the housing 36 may completely enclose the motor 70. Accordingly, in these embodiments, the housing 36 may include a transparent material, semi-transparent material, light piping, or other similar material that permits light emitted from the illumination module 50 to pass through housing 36 and contact the needle 34. Alternatively, the illumination module 50 may be removed in this embodiment, and the needle 34 may receive light from the display 20 in order to illuminate, as described above.

The material of the housing 36 may correspond to how the pointer display assembly 30 is coupled to the display 20. As an example, if the pointer display assembly 30 is coupled to the display 20 using an adhesive material (described below in further detail with reference to FIGS. 6A to 6C), the housing 36 may include any suitable material and shape configured to bond to the adhesive material. As another example, if the pointer display assembly 30 is coupled to the display 20 using a clamping or fastening material (described below in further detail with reference to FIGS. 6A to 6C), the housing 36 may include a metal, plastic, or other similar material that enables the pointer display assembly 30 to attach to a frame of the display 20 or other nearby components to fix the position of the pointer display 30 at the correct location on the display 20. Additionally, if the pointer display assembly 30 is coupled to the display 20 using a lamination method (described below in further detail with reference to FIGS. 6A to 6C), the housing 36 may include a material that enables the glass layer of the display 20 and the housing 36 to fuse together. As another example, if the pointer display assembly 30 is coupled to the display 20 using a magnetic material (described below in further detail with reference to FIGS. 6A to 6C), the housing 36 may include a magnetic material that enables the housing 36 to attach to the display 20, the frame of the instrument cluster 22, or nearby components.

Figure 5E:
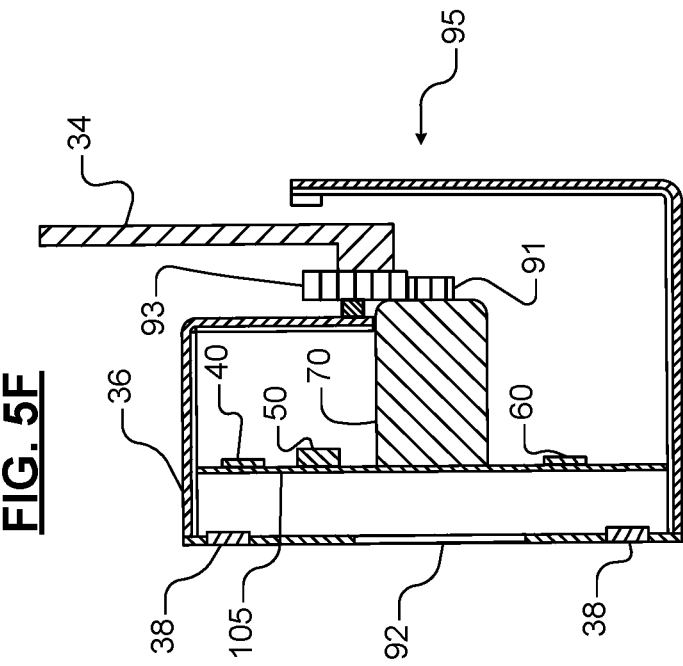
Figure 5F:
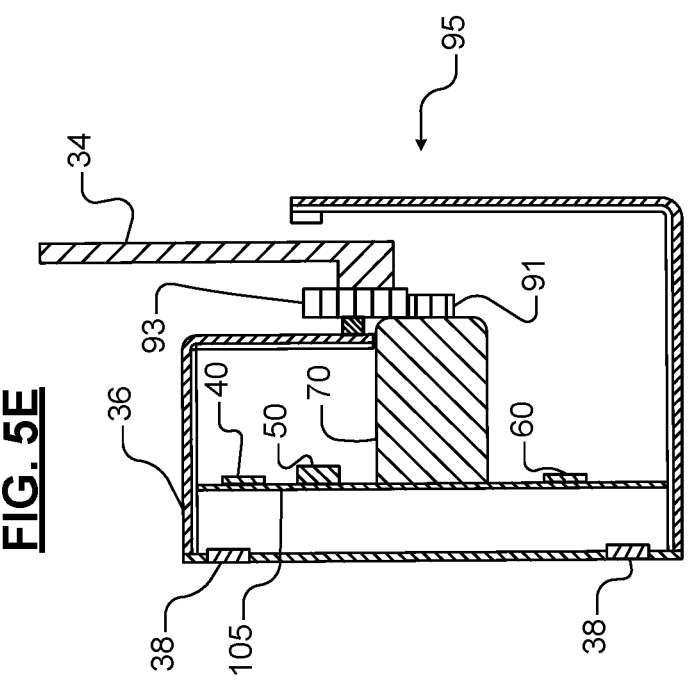

With reference to FIGS. 5E and 5F, additional example implementations of the pointer assembly 30 are shown. The example implementations of FIGS. 5E and 5F are similar to the example implementations of FIGS. 5A to 5D, except that the hub 32 is omitted and replaced with a gear assembly that includes gears 91, 93, In these example implementations, the motor 70 rotates a first gear 91 that is intermeshed with a second gear 93. The needle 34 is attached to the second gear 93 and rotates with the second gear 93. While these example implementations are shown with a gear assembly that includes two gears, 91, 93, a gear assembly with additional gears may also be used. As shown in FIGS. 5E and 5F, a portion 95 of the housing 36 may be configured to encompass, house, and/or overlap with the gear assembly and the needle 34 to protect the gear assembly. As shown, the example implementation of FIG. 5F includes the photovoltaic converter system 92, while the example implementation of FIG. 5E does not include the photovoltaic converter system 92.

Figure 6A:
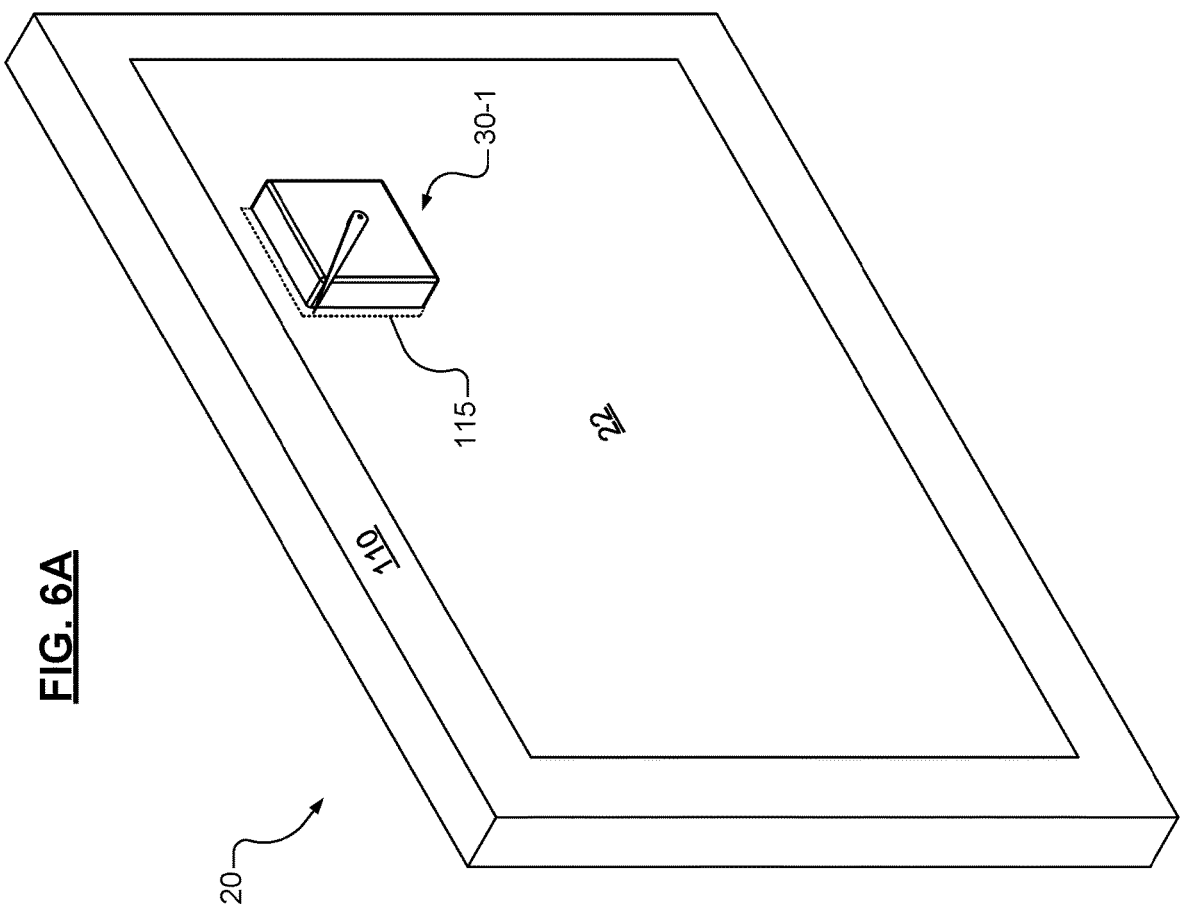

With reference to FIGS. 6A-6C, illustrations of pointer assemblies 30-1, 30-2, 30-3, 30-4 coupled to the display 20 are shown. The display 20 may include a frame 110, such as a plastic or metal bezel, located around the display 20. In the example embodiment of FIG. 6A, pointer display assembly 30-1 may be attached to the display 20 using an adhesive material 115, such as a glue or other adhesive material that securely bonds the pointer display assembly 30-1 to the glass layer of the display 20 or to a separate thin glass or thin clear plastic layer that is appropriately sized to be placed over and attached to the display 20. If a separate thin glass or thin clear plastic layer is used, the pointer display assembly 30-1 can be attached to the thin glass or thin clear plastic layer and the thin glass or thin clear plastic layer can then be attached or adhered to the display using an adhesive, magnets, mounting clamps, screws, or another suitable adhesive or attachment mechanism for attaching or adhering the thin glass or thin clear plastic layer to the display 20. The display 20 can be configured with markings and/or with a peel-off plastic stencil sheet that indicates the location that the pointer display assembly 30-1 should be adhered to the display 20. Additionally or alternatively, the display 20 can be configured to display a test screen that illustrates the location that the pointer display assembly 30-1 should be adhered to the display 20. Additionally or alternatively, the adhesive pads can be first placed on the display 20 and the pointer display assembly 30-1 can then be adhered to the adhesive pads. Additionally or alternatively, as shown in the example implementation of FIG. 6B, pointer display assembly 30-2 and the display 20 may be laminated such that the glass layer of the display 20 and the housing 36 of the pointer display assembly 30-2 are fused together. In this way, the pointer display assembly 30-2 can be fused to the glass of the display 20.

As shown in FIG. 6C, pointer display assembly 30-3 may be coupled to display 20 using clamps 130. Specifically, the clamps 130, which are partially disposed within an opening of the housing 36 of the pointer display assembly 30-3 may be fixed to frame 120 the display 20 as indicated by dashed boxes 140. Alternatively, the pointer display assembly 30-3 can be attached to another location, such as a frame or bezel of an instrument cluster 22. The clamps 130 can be fixed to the frame 120 of the display using a welding material, an adhesive material, or other suitable fastening material or mechanism, such as screws. As a result of the pointer display assembly 30-3 being attached to the frame 120, the pointer display assembly 30-3 may be securely disposed on the display 20.

As further shown in FIG. 6C, pointer display assembly 30-4 may be coupled to the display 20 using magnetic clamps 150. Specifically, the magnetic clamps 150, which are partially disposed within an opening of the housing 36 of the pointer display assembly 30-4, may be magnetically coupled to a magnetic element 160, which is disposed on the display 120. As a result of the pointer display assembly 30-4 being magnetically coupled to the frame 120 via the magnetic element 160, the pointer display assembly 30-4 may be securely disposed on the display 20. While the magnetic clamps 150 are illustrated as being partially disposed within the housing 36 of the pointer display assembly 30-4, and the magnetic element 160 is illustrated as disposed on the liquid crystal frame, the magnetic clamps 150 and the magnetic element 160 may be positioned at other locations within the instrument cluster 22 that enable the pointer display assembly 30-4 to be disposed on the display 20. Further, while the above example embodiments illustrate different systems and methods for attaching the pointer display assemblies 30 to the display 20, any suitable system or method for attaching the pointer display assemblies to the display 20 can be used, such as clamps, screws, magnets, adhesives, adhesive pads, laminated sheets, etc. Additionally, as mentioned above, the pointer display assemblies can be attached, adhered, or fused to a glass or plastic layer of the display 20 or attached, adhered, or fused to a thin glass or plastic layer that is appropriately sized to be attached, adhered, or fused to the display 20.

Figure 7:
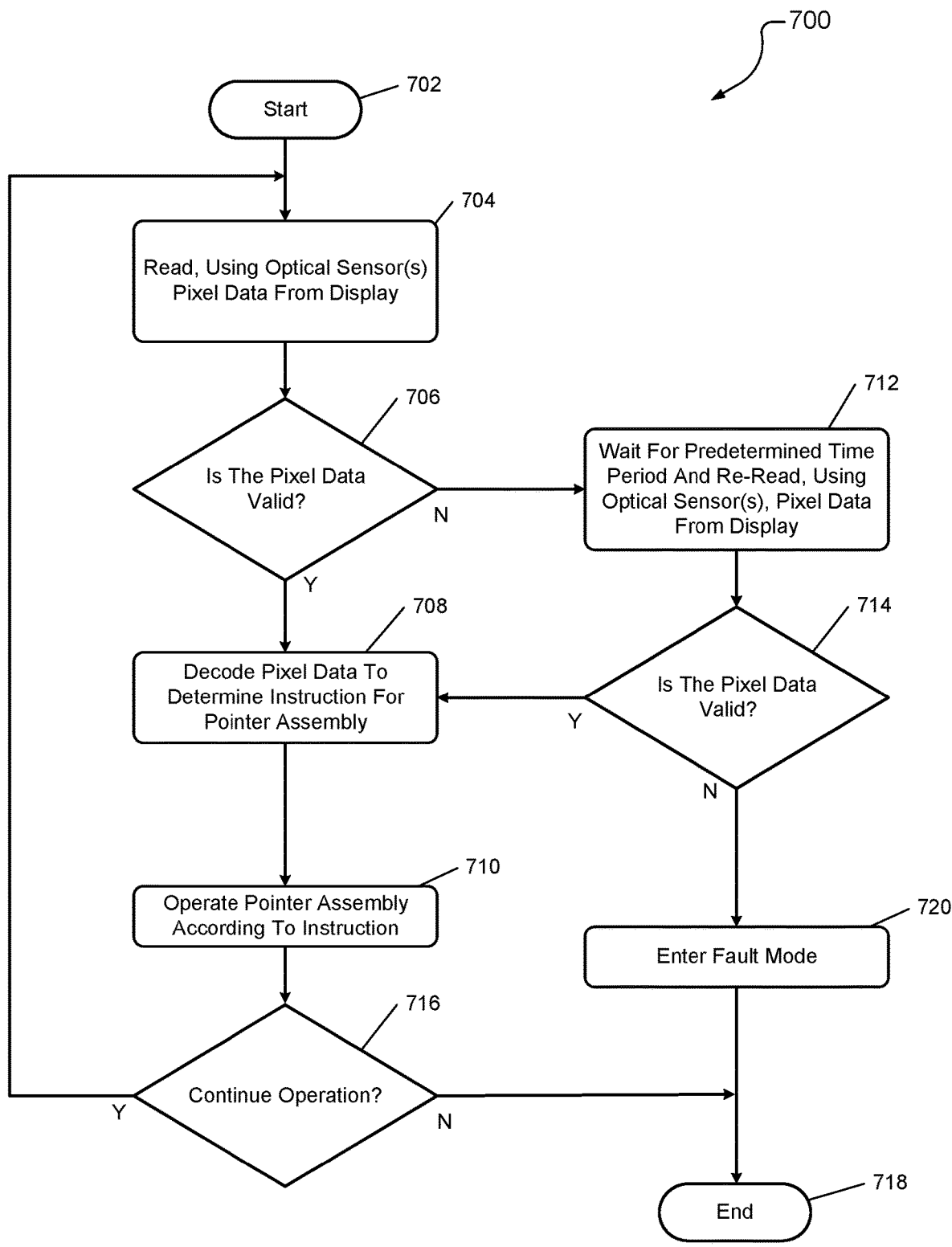
FIG. 7 illustrates a flowchart of an example control algorithm according to the present disclosure.

With reference to FIG. 7, a flowchart illustrating an example control algorithm 700 is shown. The control algorithm 700 may be executed when, for example, the pointer display assembly 30 includes the optical sensor(s) 38. The control algorithm 700 begins at 704 when, for example, the display 20 is turned on, which can occur when the vehicle is turned on. At 704, the optical sensor(s) 38 read the pixel data from the portion of the display 20 underneath the pointer display assembly 30. As discussed above, the pixel data can include instructions for the needle control module 40, from the ECM 80. For example, the pixel data can include predetermined patterns, graphics, shapes, colors, etc., of light from the display 20 that correspond to predetermined instructions for the needle control module 40. At 706, the needle control module 40 determines whether the pixel data is valid. For example, the needle control module 40 can determine whether the patterns, graphics, shapes, colors, etc., of light from the display 20 sensed by the optical sensor(s) 38 correspond to a valid format of a valid instruction from the predetermined instructions. At 706, when the pixel data is valid, the need control module 40 proceeds to 708 and decodes the pixel data to determine the particular instruction for the pointer display assembly 30 that has been communicated to the pointer display assembly 30 from the ECM 80 through the display 20. At 708, the instructions can include a series of instructions such that the needle control module 40 receives and decodes multiple sets of pixel data from the optical sensors 38 over time until the complete instruction is received.

Once the instruction(s) are decoded at 710, the needle control module 40 proceeds to 710 and operates the pointer display assembly 30 according to the instructions. For example, based on the instruction(s), the needle control module 40 can instruct the motor driver 60 with a pointer angle instruction to rotate the motor 70, and consequently the needle 34, to rotate appropriately, such as to a different angle location. Once the pointer display assembly 30 has been appropriately operated according to the instruction, the needle control module 40 determines whether to continue operation. If the display 20 or vehicle has been turned off, for example, the needle control module 40 may determine that it should not continue operation and can proceed to 718 where the control algorithm 700 ends. At 716, when the needle control module 40 determines that it should continue operation, it loops back to 704 and starts the control algorithm 700 again.

At 706, when the needle control module 40 determines that the pixel data is not valid, it proceeds to 712 and waits for a predetermined time period. After the predetermined time period, optical sensor(s) 38 re-read the pixel data from the display 20. The needle control module 40 then proceeds to 714 and determines whether the received pixel data is valid. When the received pixel data is valid, the needle control module 40 proceeds to 708 and decodes the pixel data, as discussed above. At 714 when the received pixel data is not valid, the needle control module 40 proceeds to 720 and enters a fault mode. The control algorithm then ends at 718.

With reference to FIGS. 8A to 8C and 9A to 9G, various example implementations for systems and methods of attaching the pointer display assembly 30 to a display 20 are shown. The example implementations of FIGS. 8A to 8C and 9A to 9G each include a channel 200 on the bottom of the pointer display assembly 30 that is configured to receive and contain a glue 212 that adheres the pointer display assembly 30 to a substrate 210, such as a glass or clear plastic layer of a display 20 or a thin glass or plastic layer that is adhered or attached to a display 20. The channel 200 receives the glue 212 and beneficially contains the glue 212 within the channel 200 to prevent the glue from flowing outside of the footprint of the pointer display assembly 30 and onto the display 20 itself. In this way, the pointer display assembly 30 can be glued or adhered to the display 20 or to a layer that is attached to the display without the glue 212 being visible to an operator viewing the display 20 and the pointer display assembly 30.

Figure 8A:
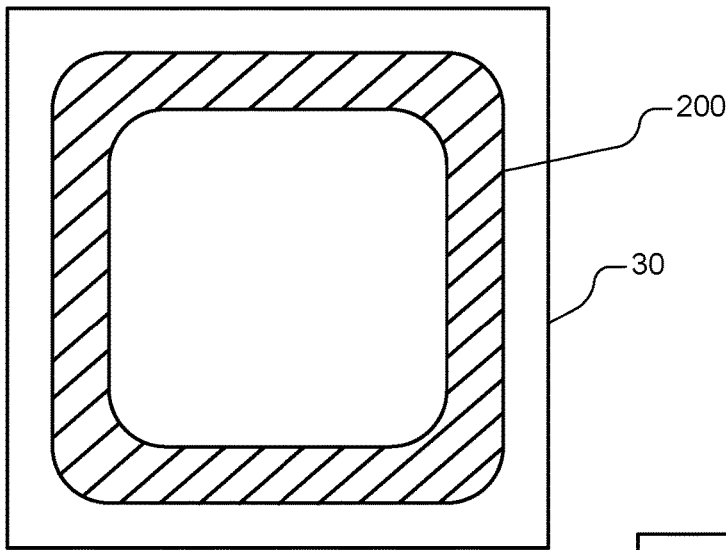
FIGS. 8A to 8C illustrate bottom views of pointer display assemblies according to the present disclosure.
Figure 8B:
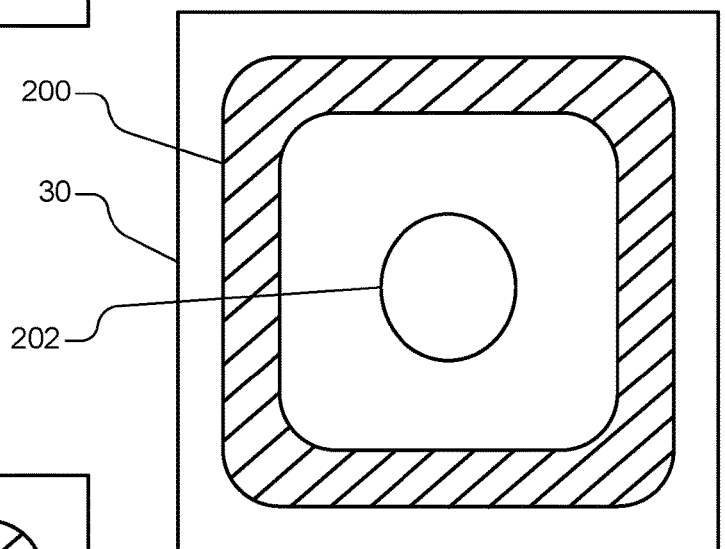
Figure 8C:
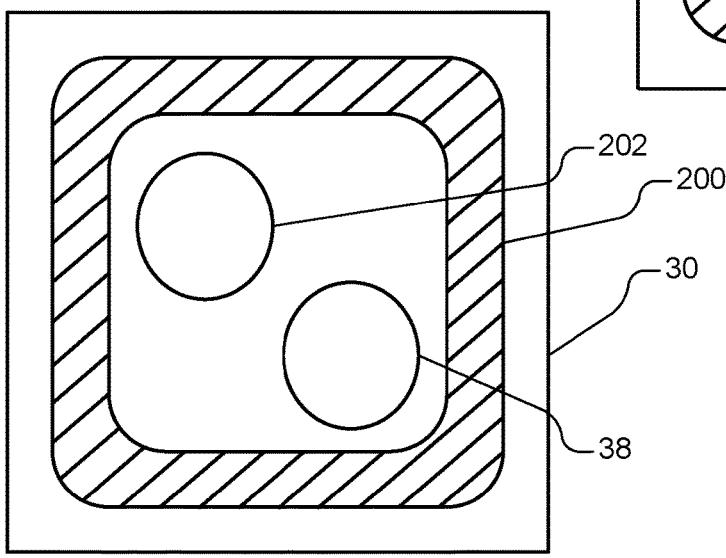

FIGS. 8A to 8C show a bottom side view of the pointer display assembly 30 with the channel 200 generally encircling a perimeter of the pointer display assembly 30. FIGS. 9A to 9G show a cross-sectional view of the pointer display assembly 30 with the cross-section of the channel 200 being shown with two cross-sectional parts towards the perimeter of the pointer display assembly 30.

With reference to FIG. 8A, the bottom of the pointer display assembly 30 is shown with the channel 200. With reference to FIG. 8B, the bottom of the pointer display assembly 30 is shown with the channel 200 as well as with a lens 202, discussed in further detail below with reference to FIGS. 9E and 9F. With reference to FIG. 8C, the bottom of the pointer display assembly 30 is shown with the channel 200, the lens 202, discussed in further detail below with reference to FIGS. 9E and 9F, and optical sensor(s) 38, discussed above.

Figure 9A:
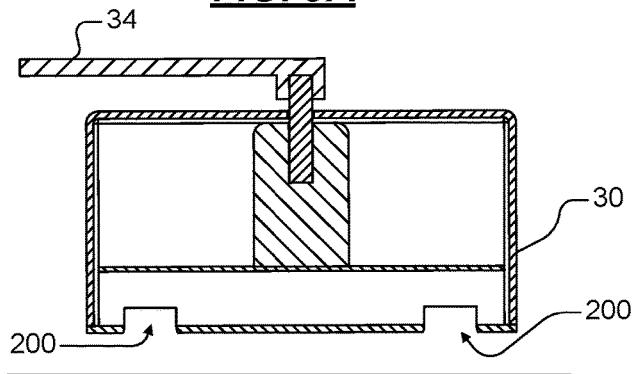
FIGS. 9A to 9G illustrate cross-sectional views of pointer display assemblies according to the present disclosure.
Figure 9B:
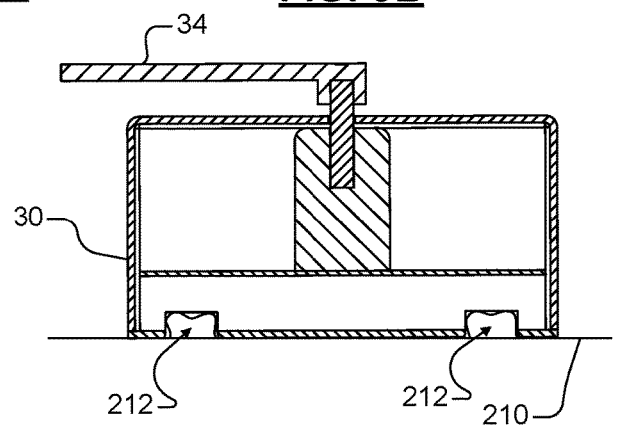

With reference to FIG. 9A, the pointer display assembly 30 with the channel 200 is shown in cross section above the substrate 210 and prior to gluing the pointer display assembly 30 to the substrate 210. With reference to FIG. 9B, the pointer display assembly 30 is shown glued to the substrate 210 with glue 212 having been received in the channel 200. As noted above, the substrate 210 can be a glass or clear plastic layer of a display 20 or a thin glass or plastic layer that is adhered or attached to a display 20.

Figure 9C:
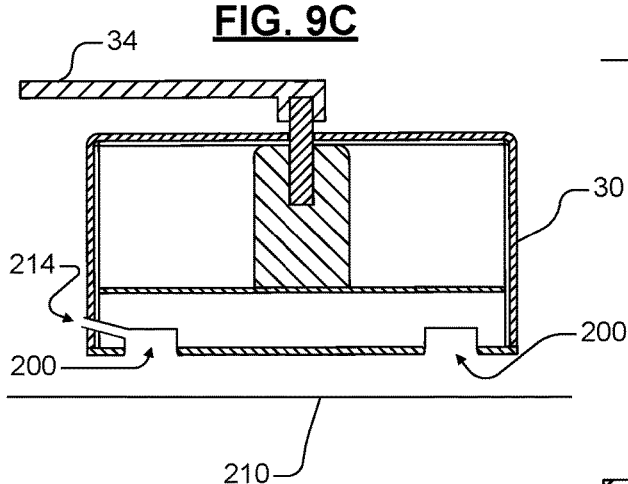
Figure 9D:
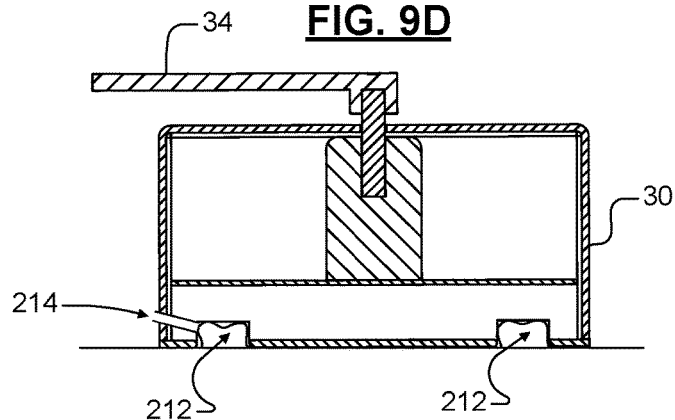

With reference to FIGS. 9C and 9D, FIGS. 9C and 9D are similar to FIGS. 9A and 9B, respectively, except the example implementation of FIGS. 9C and 9D include a glue passage 214. The glue passage 214 is configured to allow glue to be inserted from a sidewall of the pointer display assembly 30 and flow through the glue passage 214 and into the channel 200. In this way, the pointer display assembly 30 can be positioned flush with the substrate 210 and held against the substrate 210 while glue 212 is inserted into the glue passage 214 and flows into the channel 200. The pointer display assembly 30 can be held in place flush against the substrate 210 while the glue cures until the pointer display assembly 30 is sufficiently adhered to the substrate 210 by the flue 212.

Figure 9E:
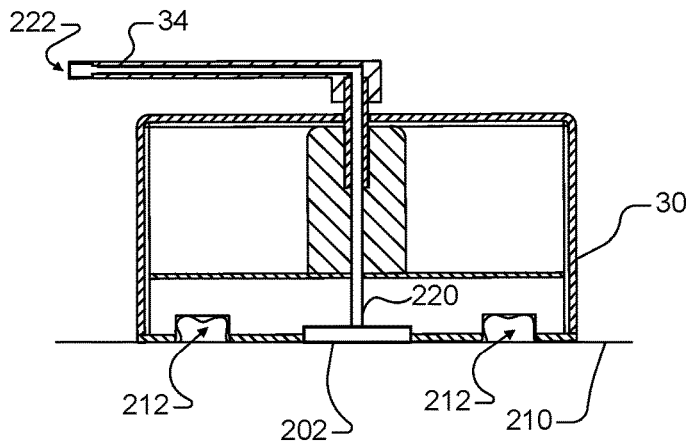

With reference to FIG. 9E, the example implementation of FIG. 9E is similar to FIGS. 9A and 9B, except that FIG. 9E includes a lens 202 on the bottom side of the pointer display assembly 30 that is flush against the substrate 210. The example implementation of FIG. 9E also includes a light pipe 220 that directs light from the lens, through the pointer display assembly, through the needle 34, to a tip 222 of the needle 34. In the example implementation of FIG. 9E, light from the display 20 is received by the lens 202 and directed through the light pipe 220 to illuminate a tip 222 of the needle 34. While only the tip 222 of the needle 34 is illuminated in the example implementation of FIG. 9E, the light pipe 220 can be configured to illuminate any portion of the needle 34 or the pointer display assembly 30. With the example implementation of FIG. 9E, the ECM 80 can control portions of the display 20 that correspond to and are located directly below the lens 202 in order to illuminate the needle 34, such as the tip 222 of the needle 34. In this way, the ECM 80 is beneficially able to illuminate the needle 34, such as the tip 222 of the needle 34, without the need for direct communication with or instructions to the needle control module 40.

Figure 9F:
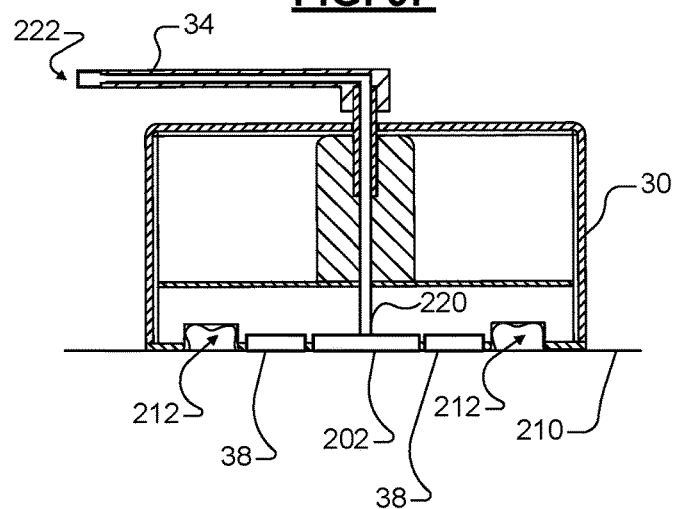

With reference to FIG. 9F, the example implementation of FIG. 9F is similar to the example implementation of FIG. 9E, except that FIG. 9F also includes optical sensors 38.

Figure 9G:
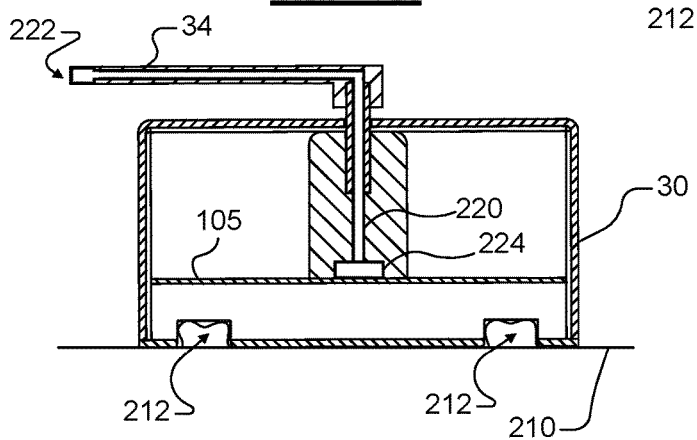

With reference to FIG. 9G, the example implementation of FIG. 9G is similar to the example implementation of FIG. 9E, except that the example implementation of FIG. 9G includes a light emitting diode (LED) 224 in place of the lens 202. In this example implementation, the needle control module 40 can control the LED 224 to illuminate the needle 34, such as a tip 22 of the needle, through light pipe 220. For example, the needle control module 40 can control the LED 224 based on instructions from the ECM 80 or based on other factors, such as a time of day. Alternatively, the needle control module 40 can control the LED 224 to illuminate the needle 34 at all times.

Figure 10A:
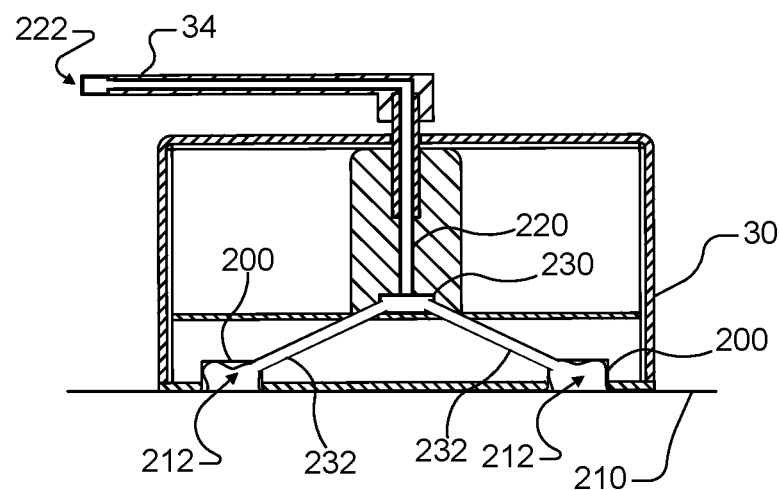
FIGS. 10A and 10B illustrate cross-sectional views of pointer display assemblies according to the present disclosure.

With reference to FIG. 10A, the example implementation of FIG. 10A is similar to the example implementations of FIGS. 9E to 9G in that the example implementation of FIG. 10A also includes a light pipe 220 configured to direct light to a tip 222 of the needle 34. The example implementation of FIG. 10A, however, does not include a lens 220 or LED 224 and instead includes additional light pipes 232 that direct light from the channel 200 to a light pipe interface 230 that connects the additional light pipes 232 to the light pipe 220. In this example implementation, the glue 212 used in the channel 200 is a clear optical adhesive that, when dry and hardened, serves as a light pipe to direct light from the display 20 through the glue 212 and into the additional light pipes 232. The light from the additional light pipes 232 is then directed into the light pipe interface 230 and into the light pipe 220, where it is then directed through the needle 34 to illuminate the tip 222 of the needle. While two additional light pipes 232 are shown in FIG. 10A, any number of additional light pipes 232 can be used. With the example implementation of FIG. 10A, the ECM 80 can control portions of the display 20 that correspond to and are located directly below the channel 200 in order to illuminate the needle 34, such as the tip 222 of the needle 34. In this way, the ECM 80 is beneficially able to illuminate the needle 34, such as the tip 222 of the needle 34, without the need for direct communication with or instructions to the needle control module 40.

Figure 10B:
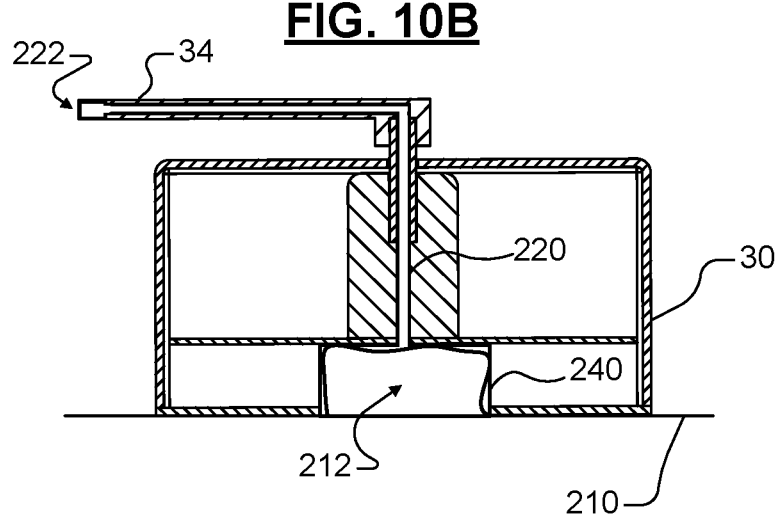

With reference to FIG. 10B, the example implementation of FIG. 10B is similar to the example implementation of FIG. 10A, except that in the example implementation of FIG. 10B the channel 200, the additional light pipes 232, and the light pipe interface 230 are replaced with a glue compartment 240 that is beneath the light pipe 220. In this example implementation, the glue 212 used in the glue compartment 240 is a clear optical adhesive that, when dry and hardened, serves as a light pipe to direct light from the display 20 through the glue 212 and into the light pipe 220. The example implementation of FIG. 10B can also be configured with a glue passage 214, describe above with reference to FIGS. 9C and 9D, to direct glue into the glue compartment 240. With the example implementation of FIG. 10B, the ECM 80 can control portions of the display 20 that correspond to and are located directly below the glue compartment 240 in order to illuminate the needle 34, such as the tip 222 of the needle 34. In this way, the ECM 80 is beneficially able to illuminate the needle 34, such as the tip 222 of the needle 34, without the need for direct communication with or instructions to the needle control module 40.

In accordance with the present teachings, a system includes a needle control module that includes a processor configured to execute instructions stored in a nontransitory computer-readable medium, a motor driver circuit in communication with the needle control module, the motor driver circuit controlling a stepper motor attached to a needle, and a housing enclosing the needle control module, the motor driver circuit, and the stepper motor, the housing being physically attached to a display of a vehicle. In response to the needle control module receiving a signal representing vehicle state information, the needle control module is configured to instruct the motor driver circuit to control movement of the stepper motor and adjust a position of the needle based on the signal.

In other features, an optical sensor receives light from the display through an opening of the housing and generates the signal based on the received light from the display.

In other features, the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

In other features, the system further comprises a photovoltaic converter system configured to convert light emitted by the display into electrical power, wherein the needle control module and the motor driver circuit receive the electrical power from the photovoltaic converter system.

In other features, the system further comprises a communication interface configured to communicate with an electronic control module of the vehicle, the needle control module receiving the signal from the electronic control module.

In other features, the communication interface is a wireless communication interface.

In other features, the communication interface is a wired communication interface.

In other features, the communication interface is a universal serial bus (USB) communication interface.

In other features, the system further comprises a power interface that receives electrical power from a power source and supplies electrical power to the needle control module and the motor driver circuit.

In other features, the power interface is a hardwired power interface that receives electrical power from the power source through at least one wire.

In other features, the power interface is a wireless power interface that receives electrical power from the power source through induction.

In accordance with the present teachings, another system includes a needle control module that includes a processor configured to execute instructions stored in a nontransitory computer-readable medium, a motor driver circuit in communication with the needle control module, the motor driver circuit controlling a stepper motor attached to a needle, and a housing enclosing the needle control module, the motor driver circuit, and the stepper motor, the housing having a channel configured to receive glue and physically attach the housing to a display of a vehicle with the glue. In response to the needle control module receiving a signal representing vehicle state information, the needle control module is configured to instruct the motor driver circuit to control movement of the stepper motor and adjust a position of the needle based on the signal.

In other features, the glue is an optical adhesive that receives light from the display, the system further comprising a light pipe that directs light from the optical adhesive, through the housing, to the needle to illuminate the needle.

In other features, the system further comprises a lens that receives light from the display, the system further comprising a light pipe that directs light from the lens, through the housing, to the needle to illuminate the needle.

In other features, the system further comprises a glue passage configured to receive the glue through a sidewall of the housing and direct the glue through the housing to the channel.

In other features, the system further comprises an optical sensor that receives light from the display through an opening of the housing and generates the signal based on the received light from the display.

In other features, the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

In accordance with the present teachings, a method includes receiving, with an optical sensor disposed within a housing of a pointer display assembly, light from a display through an opening of the housing, the pointer display assembly including a stepper motor, a needle control module, and a motor driver circuit enclosed within the housing, the stepper motor being attached to a needle, the motor driver circuit being in communication with the needle control module and controlling the stepper motor, the housing being physically attached to a display of a vehicle, and the light from the display being generated using at least one of a predetermined pattern, a predetermined graphic, a predetermined shape, and a predetermined color. The method also includes generating, with the optical sensor, a signal based on the received light from the display. The method also includes decoding, with the needle control module, the signal to determine the at least one of the predetermined pattern, the predetermined graphic, the predetermined shape, and the predetermined color. The method also includes determining, with the needle control module, vehicle state information based on the decoding of the at least one of the predetermined pattern, the predetermined graphic, the predetermined shape, and the predetermined color. The method also includes instructing, with the needle control module, the motor driver circuit to control movement of the stepper motor and adjust a position of the needle based on the vehicle state information.

In other features, the method further includes converting, with a photovoltaic converter system enclosed within the housing, light emitted by the display into electrical power, wherein the needle control module and the motor driver circuit receive the electrical power from the photovoltaic converter system.

In other features, the housing is attached to the display with an optical adhesive that receives light from the display and wherein a light pipe directs light from the optical adhesive, through the housing, to the needle to illuminate the needle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A and B should be construed to mean a logical (A OR B), using a non-exclusive logical OR. For example, the phrase at least one of A and B should be construed to include any one of: (i) A alone; (ii) B alone; (iii) both A and B together. The phrase at least one of A and B should not be construed to mean "at least one of A and at least one of B." The phrase at least one of A and B should also not be construed to mean "A alone, B alone, but not both A and B together." The term "subset" does not necessarily require a proper subset. In other words, a first subset of a first set may be coextensive with, and equal to, the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    a needle control module that includes a processor configured to execute instructions stored in a nontransitory computer-readable medium;
    a motor driver circuit in communication with the needle control module, the motor driver circuit controlling a stepper motor attached to a needle; and
    a housing enclosing the needle control module, the motor driver circuit, and the stepper motor, the housing having a channel configured to receive glue that physically attaches the housing to a display of a vehicle;
    wherein, in response to the needle control module receiving a signal representing vehicle state information, the needle control module is configured to instruct the motor driver circuit to control movement of the stepper motor and adjust a position of the needle based on the signal.

2. The system of claim 1, further comprising a photovoltaic converter system configured to convert light emitted by the display into electrical power, wherein the needle control module and the motor driver circuit receive the electrical power from the photovoltaic converter system.

3. The system of claim 1, wherein the glue is an optical adhesive that receives light from the display, the system further comprising a light pipe that directs light from the optical adhesive, through the housing, to the needle to illuminate the needle.

4. The system of claim 1, further comprising an optical sensor that receives light from the display through an opening of the housing and generates the signal based on the received light from the display.

5. The system of claim 4, wherein the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

6. The system of claim 1, further comprising a power interface that receives electrical power from a power source and supplies electrical power to the needle control module and the motor driver circuit.

7. The system of claim 6, wherein the power interface is a hardwired power interface that receives electrical power from the power source through at least one wire.

8. The system of claim 6, wherein the power interface is a wireless power interface that receives electrical power from the power source through induction.

9. The system of claim 1, further comprising a communication interface configured to communicate with an electronic control module of the vehicle, the needle control module receiving the signal from the electronic control module.

10. The system of claim 9, wherein the communication interface is a wireless communication interface.

11. The system of claim 9, wherein the communication interface is a wired communication interface.

12. The system of claim 9, wherein the communication interface is a universal serial bus (USB) communication interface.

13. A system comprising:
    a needle control module that includes a processor configured to execute instructions stored in a nontransitory computer-readable medium;
    a motor driver circuit in communication with the needle control module, the motor driver circuit controlling a stepper motor attached to a needle; and
    a housing enclosing the needle control module, the motor driver circuit, and the stepper motor, the housing having a channel configured to receive glue and physically attach the housing to a display of a vehicle with the glue;
    wherein, in response to the needle control module receiving a signal representing vehicle state information, the needle control module is configured to instruct the motor driver circuit to control movement of the stepper motor and adjust a position of the needle based on the signal.

14. The system of claim 13, wherein the glue is an optical adhesive that receives light from the display, the system further comprising a light pipe that directs light from the optical adhesive, through the housing, to the needle to illuminate the needle.

15. The system of claim 13, further comprising a lens that receives light from the display, the system further comprising a light pipe that directs light from the lens, through the housing, to the needle to illuminate the needle.

16. The system of claim 13, further comprising a glue passage configured to receive the glue through a sidewall of the housing and direct the glue through the housing to the channel.

17. The system of claim 13, further comprising an optical sensor that receives light from the display through an opening of the housing and generates the signal based on the received light from the display.

18. The system of claim 17, wherein the light from the display is generated using at least one of a predetermined pattern, a predetermined graphic, a predetermined shape, and a predetermined color and the needle control module is configured to decode the signal to determine the at least one of the predetermined pattern, the predetermined graphic, the predetermined shape, and the predetermined color and to instruct the motor driver circuit to control movement of the stepper motor and adjust a position of the needle based on at least one of the predetermined pattern, the predetermined graphic, the predetermined shape, and the predetermined color.

19. A method comprising:
receiving, with an optical sensor disposed within a housing of a pointer display assembly, light from a display through an opening of the housing, the pointer display assembly including a stepper motor, a needle control module, and a motor driver circuit enclosed within the housing, the stepper motor being attached to a needle, the motor driver circuit being in communication with the needle control module and controlling the stepper motor, the housing having a channel configured to receive glue that physically attaches the housing to a display of a vehicle, and the light from the display being generated using at least one of a predetermined pattern, a predetermined graphic, a predetermined shape, and a predetermined color;
generating, with the optical sensor, a signal based on the received light from the display;
decoding, with the needle control module, the signal to determine the at least one of the predetermined pattern, the predetermined graphic, the predetermined shape, and the predetermined color;
determining, with the needle control module, vehicle state information based on the decoding of the at least one of the predetermined pattern, the predetermined graphic, the predetermined shape, and the predetermined color; and
instructing, with the needle control module, the motor driver circuit to control movement of the stepper motor and adjust a position of the needle based on the vehicle state information.

20. The method of claim 19, further comprising converting, with a photovoltaic converter system enclosed within the housing, light emitted by the display into electrical power, wherein the needle control module and the motor driver circuit receive the electrical power from the photovoltaic converter system.

21. The method of claim 19, wherein the glue is an optical adhesive that receives light from the display and wherein a light pipe directs light from the optical adhesive, through the housing, to the needle to illuminate the needle.

\* \* \* \* \*